United States Patent
Xing et al.

(10) Patent No.: US 8,600,164 B2
(45) Date of Patent: Dec. 3, 2013

(54) METHOD AND TOOL FOR RECOGNIZING A HAND-DRAWN TABLE

(75) Inventors: Zhaohui Xing, Calgary (CA); Luqing Wang, Calgary (CA)

(73) Assignee: SMART Technologies ULC (CA)

(*) Notice: Subject to any disclaimer, the term of this patent is extended or adjusted under 35 U.S.C. 154(b) by 1340 days.

(21) Appl. No.: 12/203,605

(22) Filed: Sep. 3, 2008

(65) Prior Publication Data
US 2009/0245654 A1 Oct. 1, 2009

Related U.S. Application Data

(63) Continuation-in-part of application No. 12/058,234, filed on Mar. 28, 2008.

(51) Int. Cl.
*G06K 9/00* (2006.01)
*G06K 9/18* (2006.01)

(52) U.S. Cl.
USPC ............ 382/187; 382/186; 382/189; 382/314

(58) Field of Classification Search
USPC ................. 382/181–189, 202, 203, 312–314; 706/15; 345/156, 443
See application file for complete search history.

(56) References Cited

U.S. PATENT DOCUMENTS

| | | | |
|---|---|---|---|
| 5,392,130 A | | 2/1995 | Mahoney |
| 5,805,168 A * | | 9/1998 | Minakata ..................... 345/427 |
| 6,415,305 B1 | | 7/2002 | Agrawal et al. |
| 6,763,148 B1 * | | 7/2004 | Sternberg et al. ............. 382/293 |
| 6,952,803 B1 * | | 10/2005 | Bloomberg et al. .......... 715/236 |
| 7,106,904 B2 * | | 9/2006 | Shima .......................... 382/216 |
| 7,250,968 B2 * | | 7/2007 | Ito ............................... 348/240.2 |
| 7,366,978 B1 * | | 4/2008 | Jones et al. .................... 715/227 |
| 7,412,094 B2 * | | 8/2008 | Chen et al. .................... 382/181 |
| 2002/0159639 A1 * | | 10/2002 | Shima .......................... 382/218 |
| 2003/0174220 A1 * | | 9/2003 | Ito ............................... 348/240.2 |
| 2003/0214491 A1 * | | 11/2003 | Keely et al. ................... 345/179 |
| 2005/0001824 A1 * | | 1/2005 | Yoshimura .................... 345/179 |
| 2005/0226535 A1 * | | 10/2005 | Ghosh .......................... 382/294 |
| 2006/0132455 A1 * | | 6/2006 | Rimas-Ribikauskas et al. ............................. 345/173 |
| 2006/0132456 A1 * | | 6/2006 | Anson .......................... 345/173 |
| 2006/0132457 A1 * | | 6/2006 | Rimas-Ribikauskas et al. ............................. 345/173 |
| 2007/0140565 A1 * | | 6/2007 | Lin et al. ....................... 382/203 |
| 2007/0186152 A1 * | | 8/2007 | Gurcan et al. ................. 715/509 |
| 2007/0195084 A1 * | | 8/2007 | Cheung et al. ................ 345/420 |
| 2008/0285069 A1 * | | 11/2008 | Yasuda ......................... 358/1.15 |
| 2010/0123719 A1 * | | 5/2010 | Xing ............................. 345/443 |
| 2010/0178645 A1 * | | 7/2010 | Ieperen et al. ................ 434/323 |
| 2010/0201812 A1 * | | 8/2010 | McGibney et al. ........... 348/143 |

(Continued)

FOREIGN PATENT DOCUMENTS

EP 1 519 280 A2 3/2005

OTHER PUBLICATIONS

Glenn et al. "Word 2000 in a Nutshell" Chapter 10 1st Edition, Aug. 2000, pp. 1-22.*

(Continued)

*Primary Examiner* — Chan S Park
*Assistant Examiner* — Mia M Thomas
(74) *Attorney, Agent, or Firm* — Katten Muchin Rosenman LLP

(57) ABSTRACT

A computerized method of recognizing an input hand-drawn table formed by freeform line objects comprises transforming each freeform line object of the table into one of a vertical line segment and a horizontal line segment, generating a grid system based on the vertical and horizontal line segments and converting the generated grid system into a table object.

49 Claims, 33 Drawing Sheets

(56) References Cited

U.S. PATENT DOCUMENTS

| | | | |
|---|---|---|---|
| 2010/0246958 A1* | 9/2010 | Ma | 382/176 |
| 2010/0313155 A1* | 12/2010 | Willekes et al. | 715/769 |
| 2011/0199297 A1* | 8/2011 | Antonyuk et al. | 345/157 |

OTHER PUBLICATIONS

Supplementary European Search Report and Annex to the European Search Report for European Patent Application No. EP 09725195 with a date of completion of Feb. 13, 2012.

Jul. 3, 2012 cover letter from China Sinda in English and the Jun. 12, 2012 First Office Action for Chinese Patent Application No. 200980111413.4.

Computer-generated English translation of Chinese Patent No. CN 101452523, retrieved on Dec. 21, 2012, from <http://translationportal.epo.org/emtp/translate/?ACTION=description-retrieval&COUNTRY=CN&ENGINE=google&FORMAT=docdb&KIND=A&LOCALE=en__EP&NUMBER=101452523&OPS=cn.espacenet.com/ops&SRCLANG=zh&TRGLANG=en>.

* cited by examiner

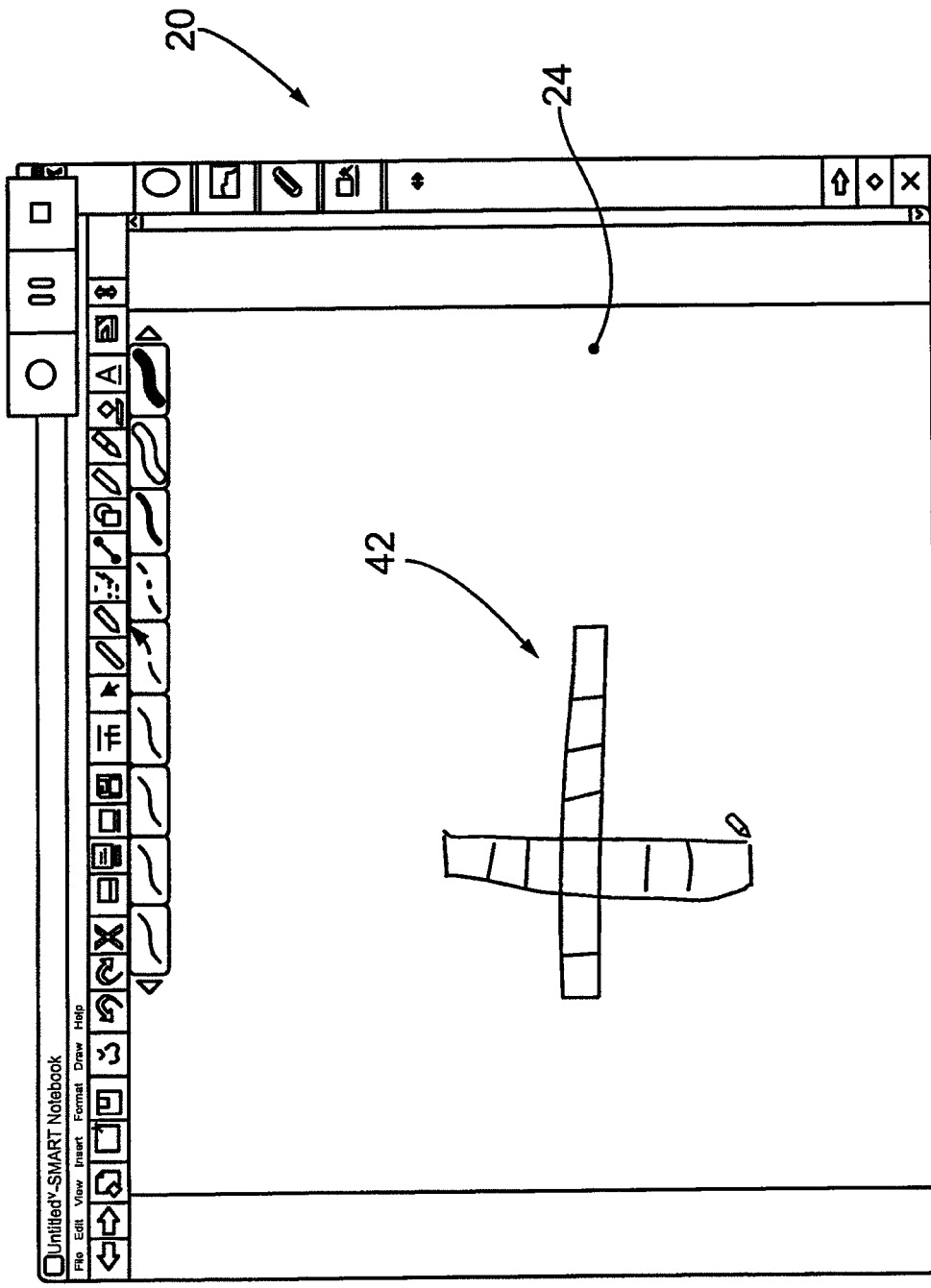

Fig. 12a

| Day<br>Name | Monday | Tuesday | Wednesday | Thursday |
|---|---|---|---|---|
| Peter | Meeting | Coding | Meeting | Meeting |
| Tom | Testing | Meeting | Project Design | Meeting |
| Joey | Coding | Testing | Coding | Meeting |

Fig. 22

| Day / Task / Name | Monday | Tuesday | Wednesday | Thursday |
|---|---|---|---|---|
| Peter | Meeting | Coding | Meeting | Meeting |
| Tom | Testing | Meeting | Project Design | Meeting |
| Joey | Coding | Testing | Coding | Meeting |

Fig. 23

METHOD AND TOOL FOR RECOGNIZING A HAND-DRAWN TABLE

CROSS-REFERENCE TO RELATED APPLICATIONS

This application is a continuation-in-part of U.S. patent application Ser. No. 12/058,234 to Zhaohui Xing filed on Mar. 28, 2008 entitled "Method and Tool for Recognizing a Hand-Drawn Table", the contents of which are incorporated herein.

FIELD OF THE INVENTION

The present invention relates generally to digital ink processing and in particular, to a method and tool for recognizing a hand-drawn table.

BACKGROUND OF THE INVENTION

Interactive input systems that allow users to inject input (i.e. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices. Although these interactive input systems are able to recognize handwriting well, their ability to recognize and represent the meaning of hand-drawn objects and in particular, charts or tables, has been limited.

Microsoft Office software includes a feature that enables tables to be created by moving a cursor over an open document. During table creation, cursor movements over the open document are translated immediately into one of rectangles, squares and straight lines. Although tables can be created, the functionality of this feature limits its ease of use in interactive input systems that accept freeform or handwritten ink as input. As will be appreciated, improvements in hand-drawn table recognition are desired.

It is therefore an object of the present invention to provide a novel method and tool for recognizing a hand-drawn table.

SUMMARY OF THE INVENTION

Accordingly, in one aspect there is provided a computerized method of recognizing an input hand-drawn table formed by freeform line objects, said method comprising:

transforming each freeform line object of said table into one of a vertical line segment and a horizontal line segment;

generating a grid system based on the vertical and horizontal line segments; and converting the generated grid system into a table object.

According to another aspect there is provided a computerized digital ink recognition method comprising:

selecting digital ink presented on a graphical user interface, said digital ink at least comprising intersecting freeform lines representing a hand-drawn table; and performing a recognition procedure on said intersecting freeform lines to recognize the hand-drawn table;

generating a table object corresponding to the hand-drawn table in response to recognition thereof.

According to another aspect there is provided a computer readable medium embodying computer program code for digital ink recognition, said computer program code comprising:

program code for selecting digital ink presented on a graphical user interface, said digital ink at least comprising intersecting freeform lines representing a hand-drawn table;

program code for performing a recognition procedure on said intersecting freeform lines to recognize the hand-drawn table;

program code for generating a table object corresponding to the hand-drawn table in response to recognition thereof.

According to yet another aspect there is provided a computer readable medium embodying computer program code for recognizing an input hand-drawn table formed by freeform line objects, said computer program code comprising:

program code for transforming each freeform line object of said table into one of a vertical line segment and a horizontal line segment;

program code for generating a grid system based on the vertical and horizontal line segments; and program code for converting the generated grid system into a table object.

According to still yet another aspect there is provided an interactive input system comprising:

a coordinate input device having a display surface on which an image is presented, said coordinate input device being responsive to user input; and processing structure communicating with said coordinate input device and updating the image presented on said display surface to reflect user input, said processing structure executing a table recognition procedure when invoked to recognize a hand-drawn table entered on said coordinate input device and convert the recognized hand-drawn table into a table object.

BRIEF DESCRIPTION OF THE DRAWINGS

Embodiments will now be described more fully with reference to the accompanying drawings in which:

FIGS. 3a to 3c, 4a and 4b show the graphical user interface during irregular hand-drawn table creation and recognition;

Figure 12A:
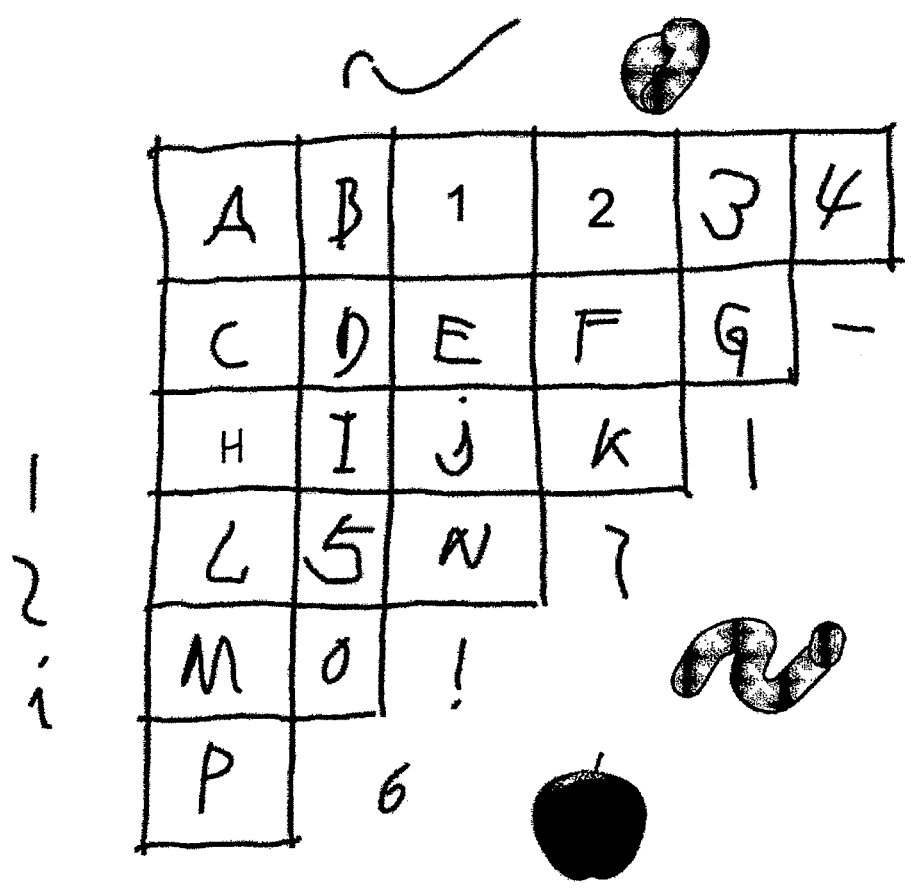

FIGS. 11a, 11b, 12a and 12b show the graphical user interface during hand-drawn table creation and recognition by the hand-drawn table recognition tool of FIGS. 9 and 10;

FIGS. 22 and 23 show populated schedule table objects.

DETAILED DESCRIPTION OF THE EMBODIMENTS

In the following, a software tool and method for recognizing freeform or hand-drawn tables input into an interactive input system such as those referred above, is described. The software tool when executed by a processing device transforms the freeform line objects or "lines" forming the hand-drawn table into horizontal and vertical line segments, generates a grid system based on the vertical and horizontal line segments and converts the generated grid system into a table object that is compatible with conventional word processing software such as for example Microsoft Word™.

Figure 1A:
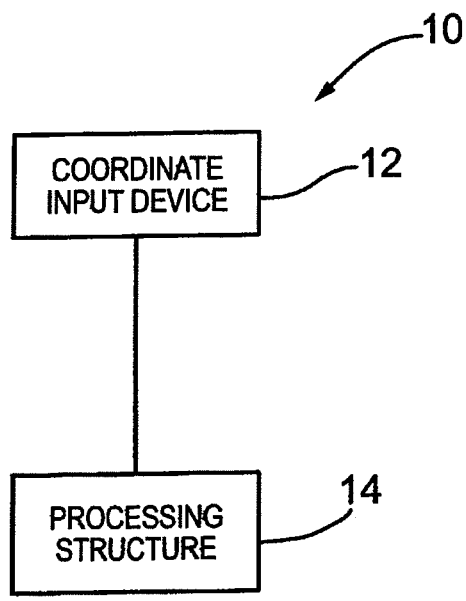
FIG. 1a is a block diagram of an interactive input system.

Turning now to FIG. 1a, a block diagram of an interactive input system is shown and is generally identified by reference numeral 10. Interactive input system 10 comprises a coordinate input device 12 such as for example a touch panel on which pointer contacts can be made. The coordinate input device 12 communicates with processing structure 14 executing one or more application programs. Image data generated by the processing structure 14 is displayed on the display surface of the coordinate input device 12 allowing a user to interact with the displayed image via pointer contacts on the coordinate input device. The processing structure 14 interprets pointer contacts as input to the running application program and updates the image data accordingly so that the image displayed on the display surface reflects the pointer activity. In this manner, the coordinate input device 12 and processing structure 14 form a closed loop allowing pointer interactions with the coordinate input device 12 to be recorded as handwriting or drawing or used to control execution of the application program. The coordinate input device 12 of the interactive input system 10 may be separate from the processing structure 14 as is shown in the above-incorporated patents assigned to SMART Technologies ULC or may be combined with the processing structure to form an integral compact unit as in the case of personal computers (PCs), tablet PCs, laptop PCs, personal digital assistants (PDAs), cellular telephones or other suitable devices.

The processing structure 14 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

The processing structure 14 runs a host software application such as SMART Notebook™ offered by SMART Technologies ULC. As is known, during execution, the SMART Notebook™ application provides a graphical user interface comprising a canvas page or palette, that is presented on the display surface of the coordinate input device 12 on which freeform or handwritten ink objects and other objects can be input and manipulated via pointer interaction with the coordinate input device. The SMART Notebook™ application in this embodiment, is provided with a tool for recognizing hand-drawn tables and converting such hand-drawn tables into corresponding table objects.

Figure 1B:
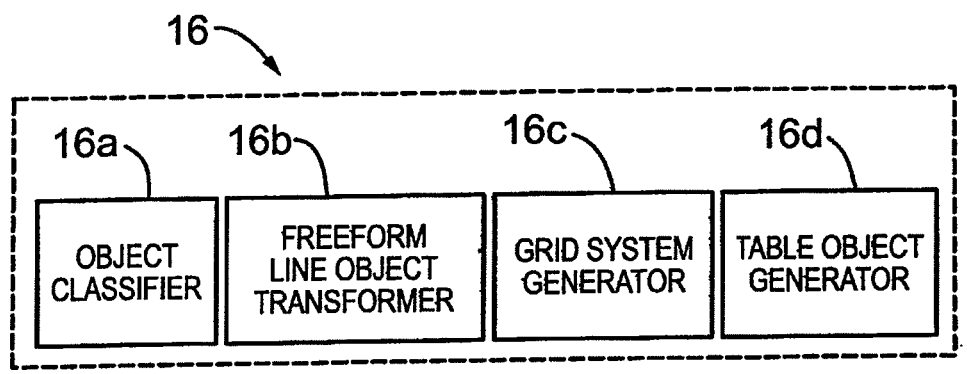
FIG. 1b is a block diagram showing the components of a hand-drawn table recognizing tool.

FIG. 1b is a block diagram showing the components of the hand-drawn table recognizing tool 16. As can be seen, the hand-drawn table recognizing tool comprises an object classifier 16a to classify selected objects into table outline elements and table cell content elements, a freeform line object transformer 16b to transform table outline elements into vertical and horizontal line segments, a grid system generator 16c to create a grid system identifying the intersection points of the vertical and horizontal line segments and a table object generator 16d to create a table object based on the intersection points.

Figure 2A:
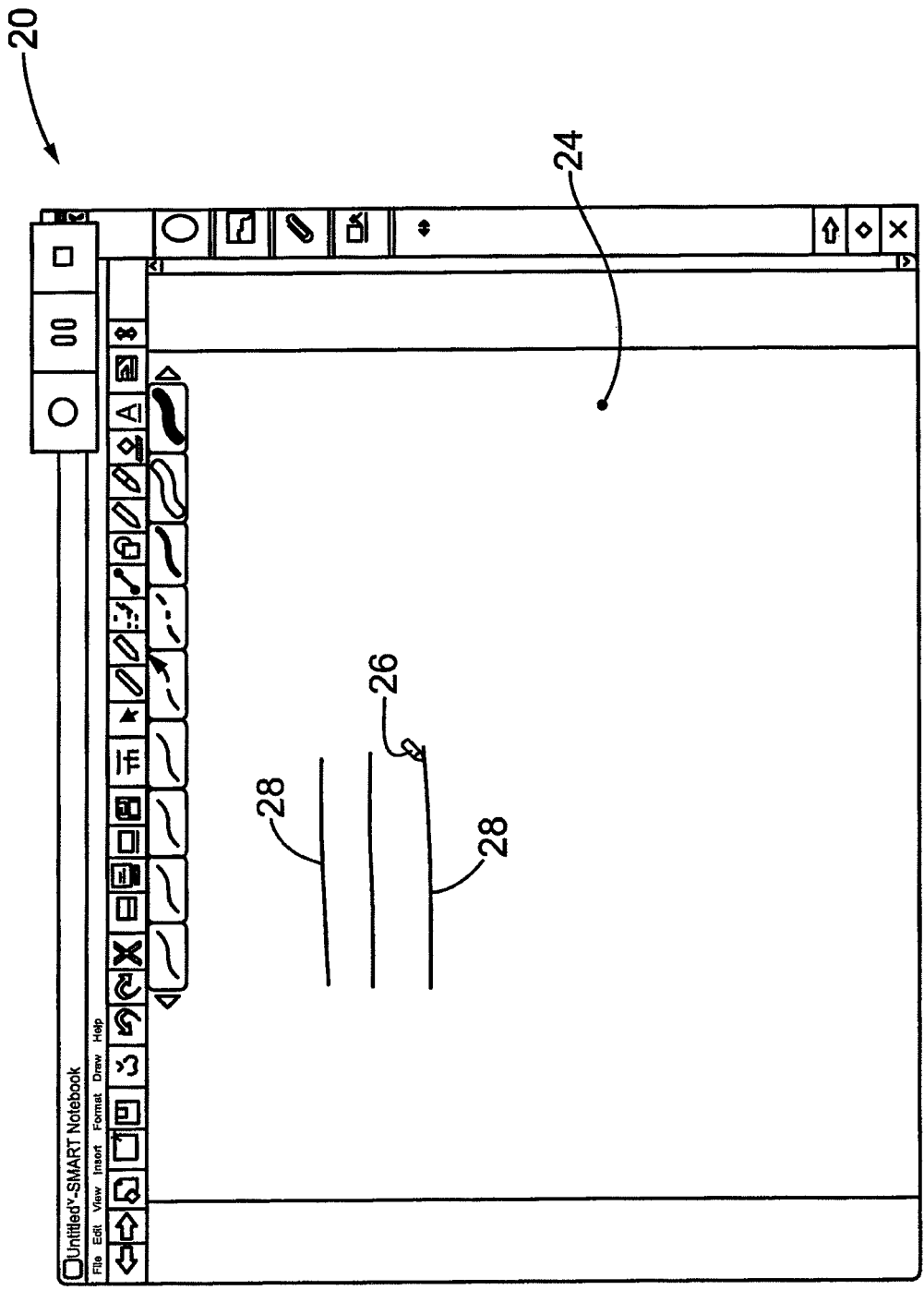
FIGS. 2a to 2e show a graphical user interface presented on the display surface of a coordinate input device during hand-drawn table creation and recognition.
Figure 2B:
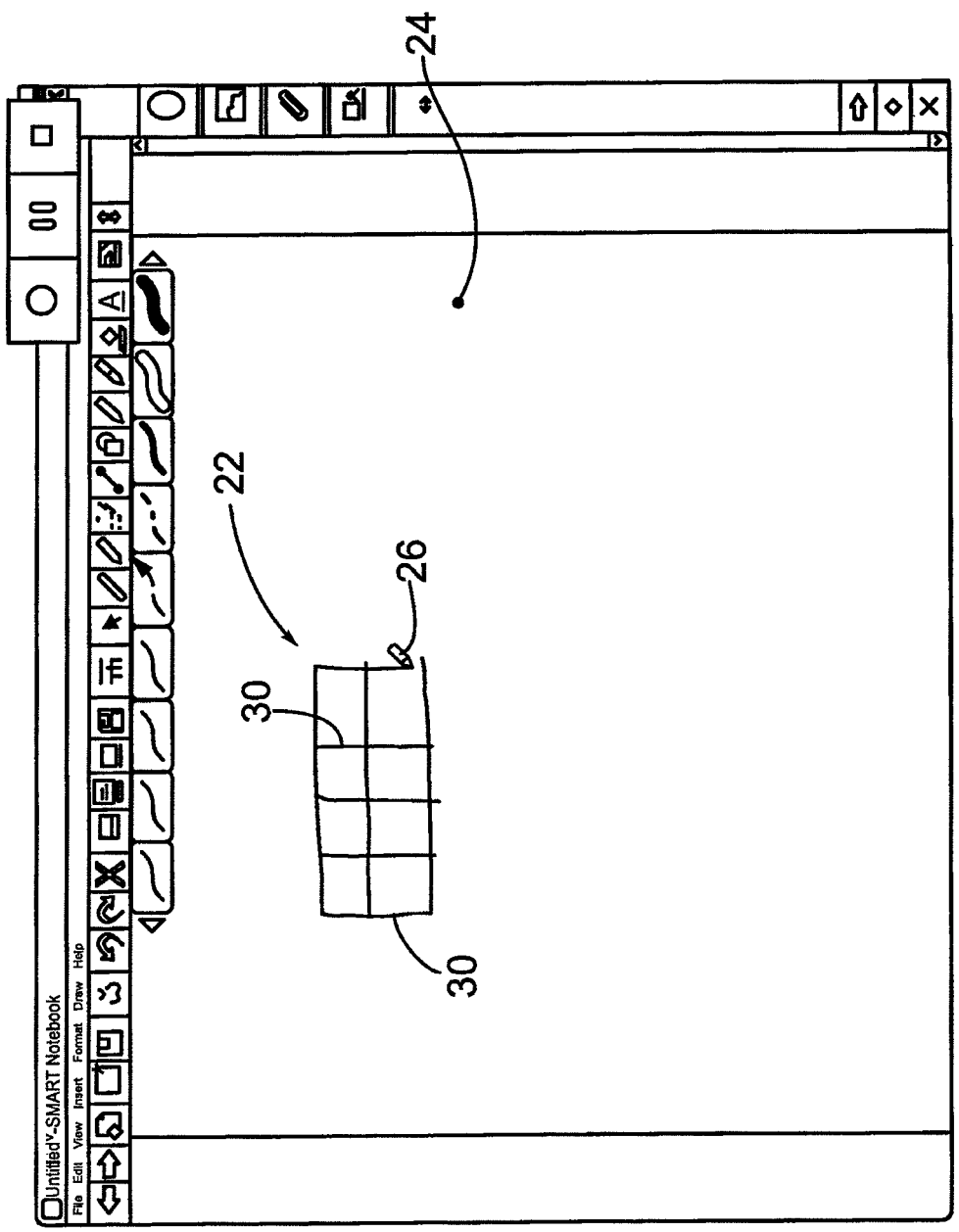

FIGS. 2a and 2b show the graphical user interface 20 presented on the display surface of the coordinate input device 12. In FIGS. 2a and 2b, a hand-drawn table 22 is being input on the canvas page 24 of the graphical user interface 20 in response to movement of a pointer 26 across the display surface of the coordinate input device 12. In this embodiment, the generally horizontal freeform lines 28 forming the hand-drawn table 22 are input first followed by the generally vertical freeform lines 30. After the hand-drawn table 12 has been input on the canvas page 24, the hand-drawn table 22 can be recognized and converted into a table object by selecting or highlighting the hand-drawn table 22 then invoking the hand-drawn table recognizing tool 16.

Figure 2C:
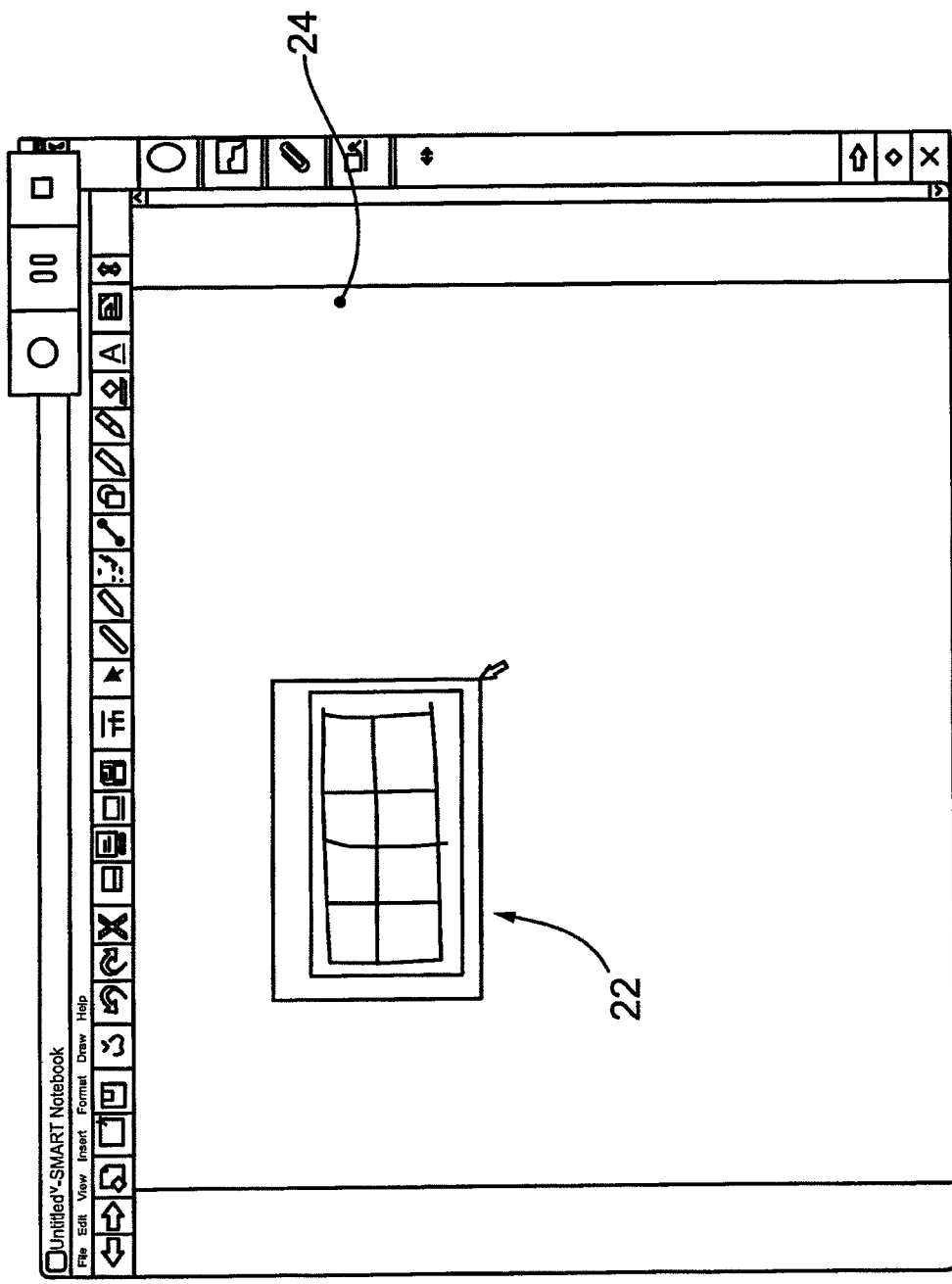
Figure 2D:
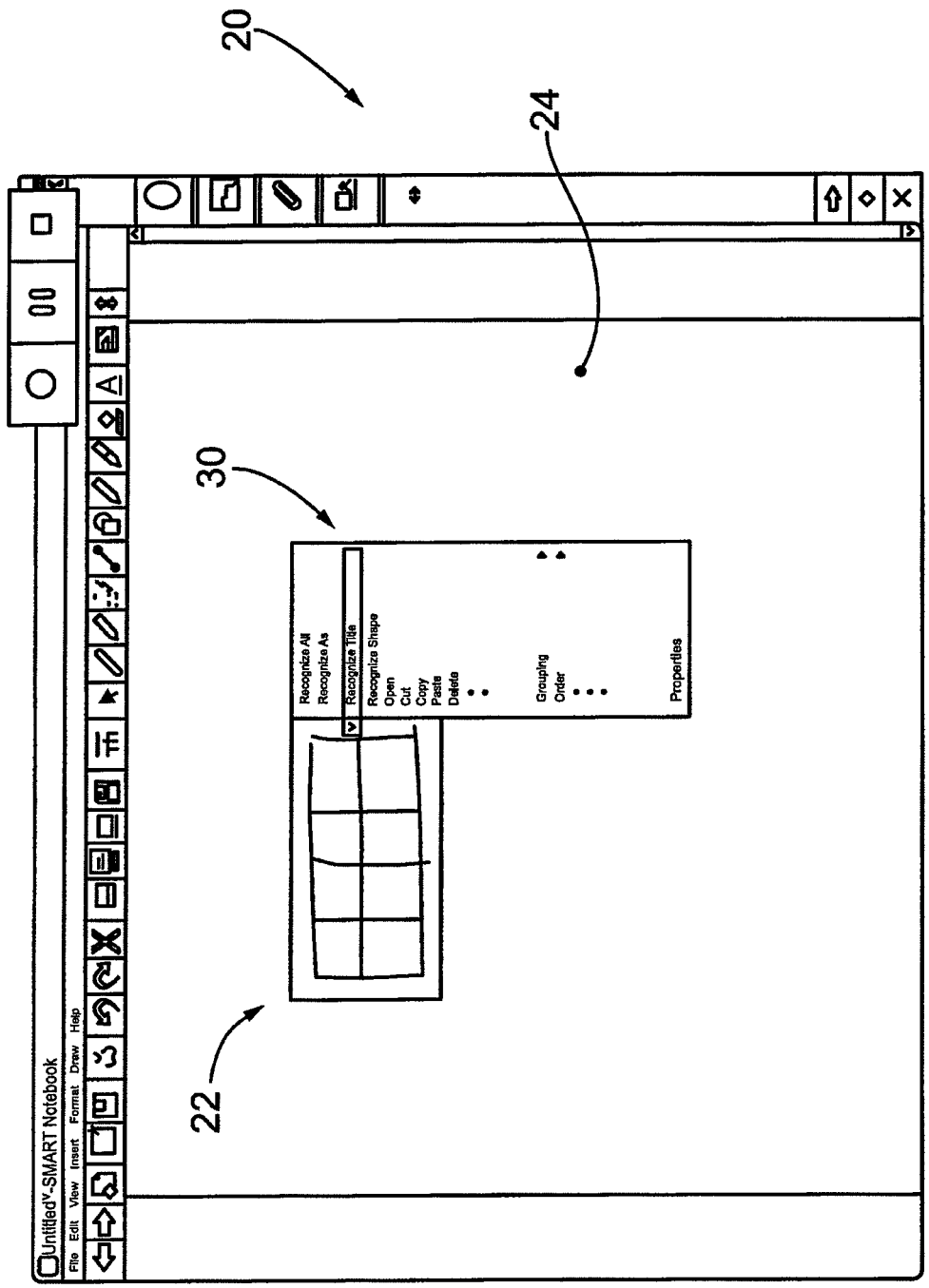
Figure 2E:
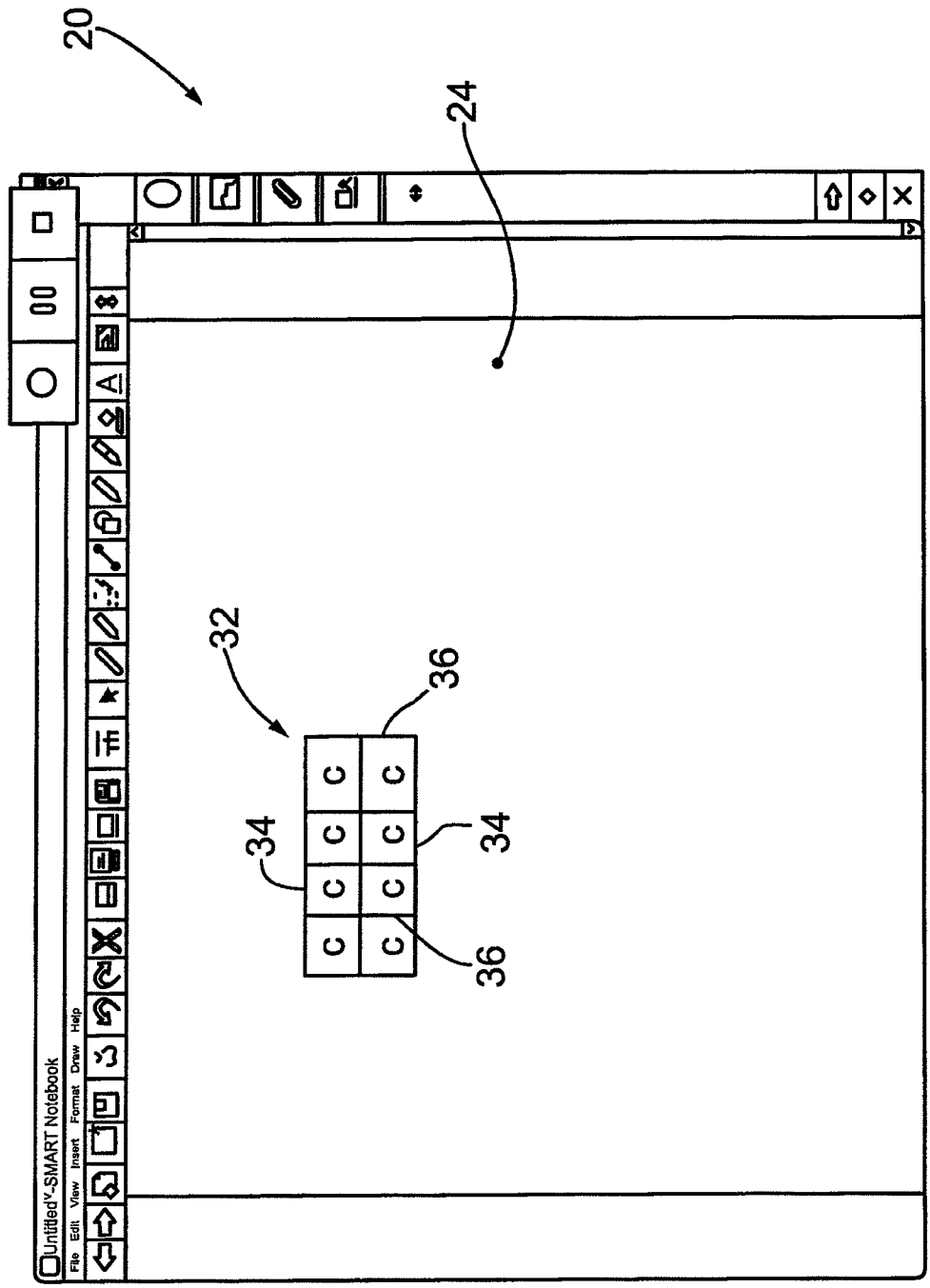

FIGS. 2c and 2d show the hand-drawn table 22 when selected as well as a drop-down menu M that is presented to the user allowing the user to select and invoke the hand-drawn table recognizing tool 16. Once invoked, the hand-drawn table recognizing tool 16 converts the hand-drawn table into a table object 32 with straight horizontal and vertical lines 34 and 36 respectively as shown in FIG. 2e. As will be appreciated, the cells of the table object 32 have dimensions generally corresponding to those of the hand-drawn table 22.

Figure 3A:
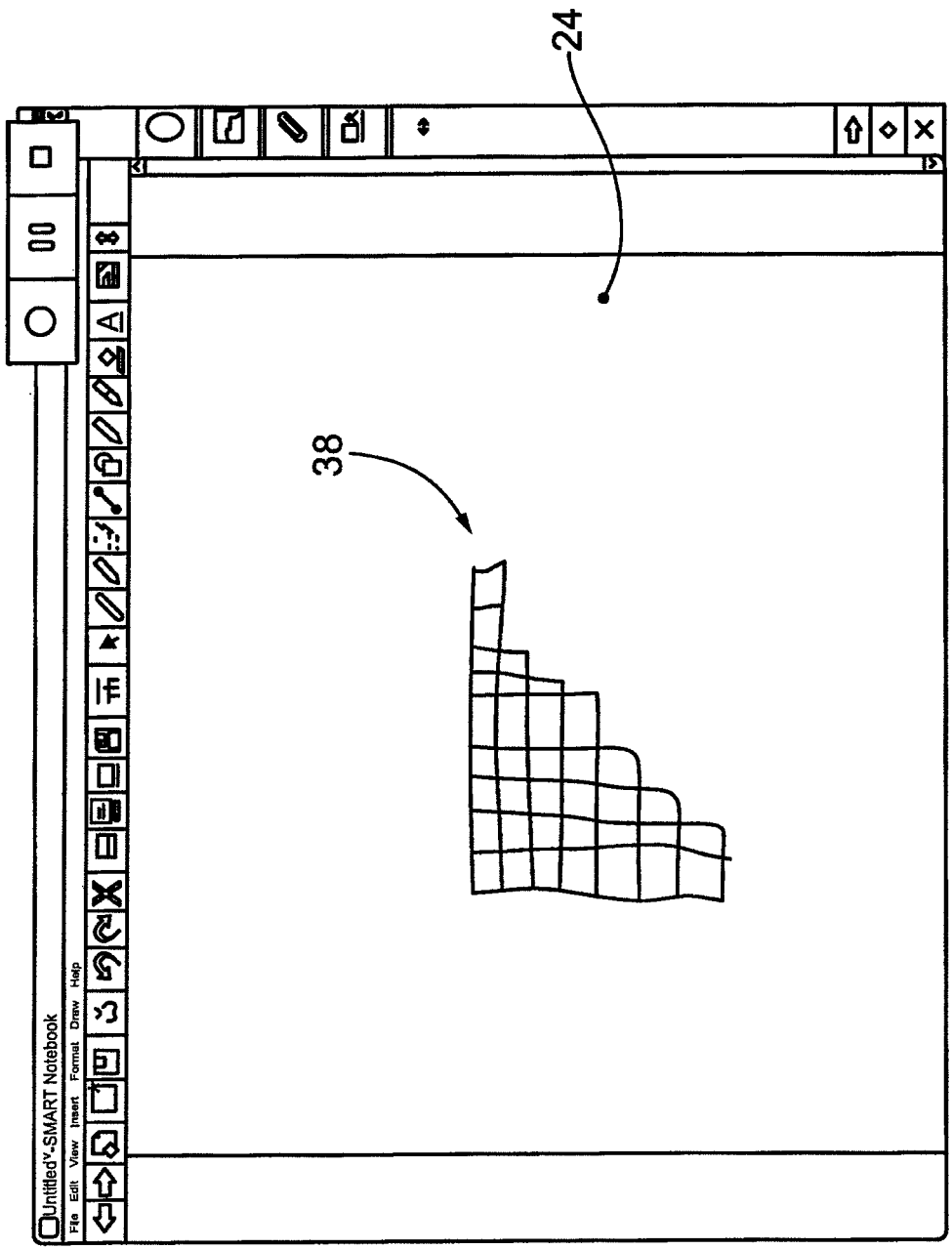
Figure 3B:
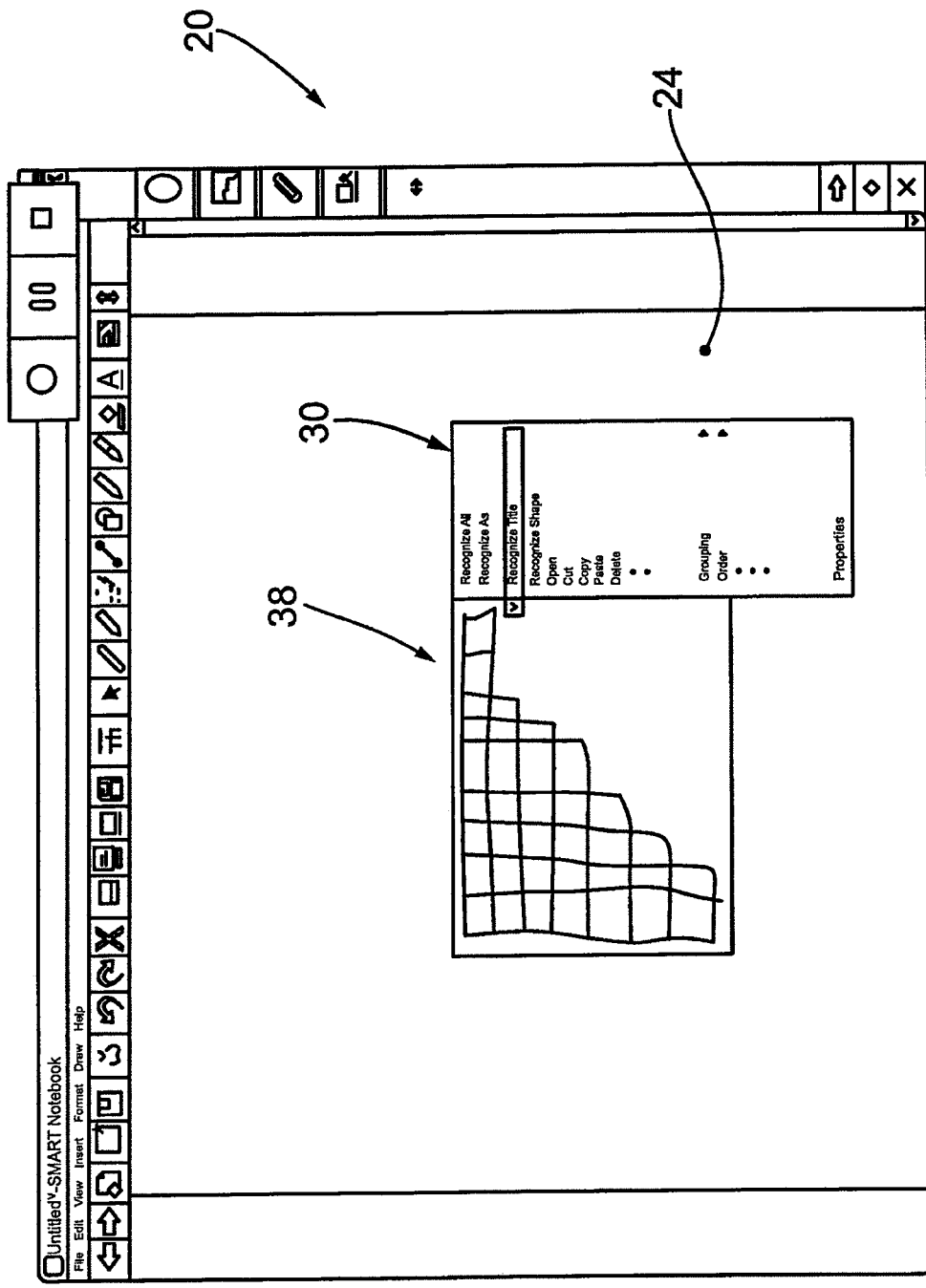
Figure 3C:
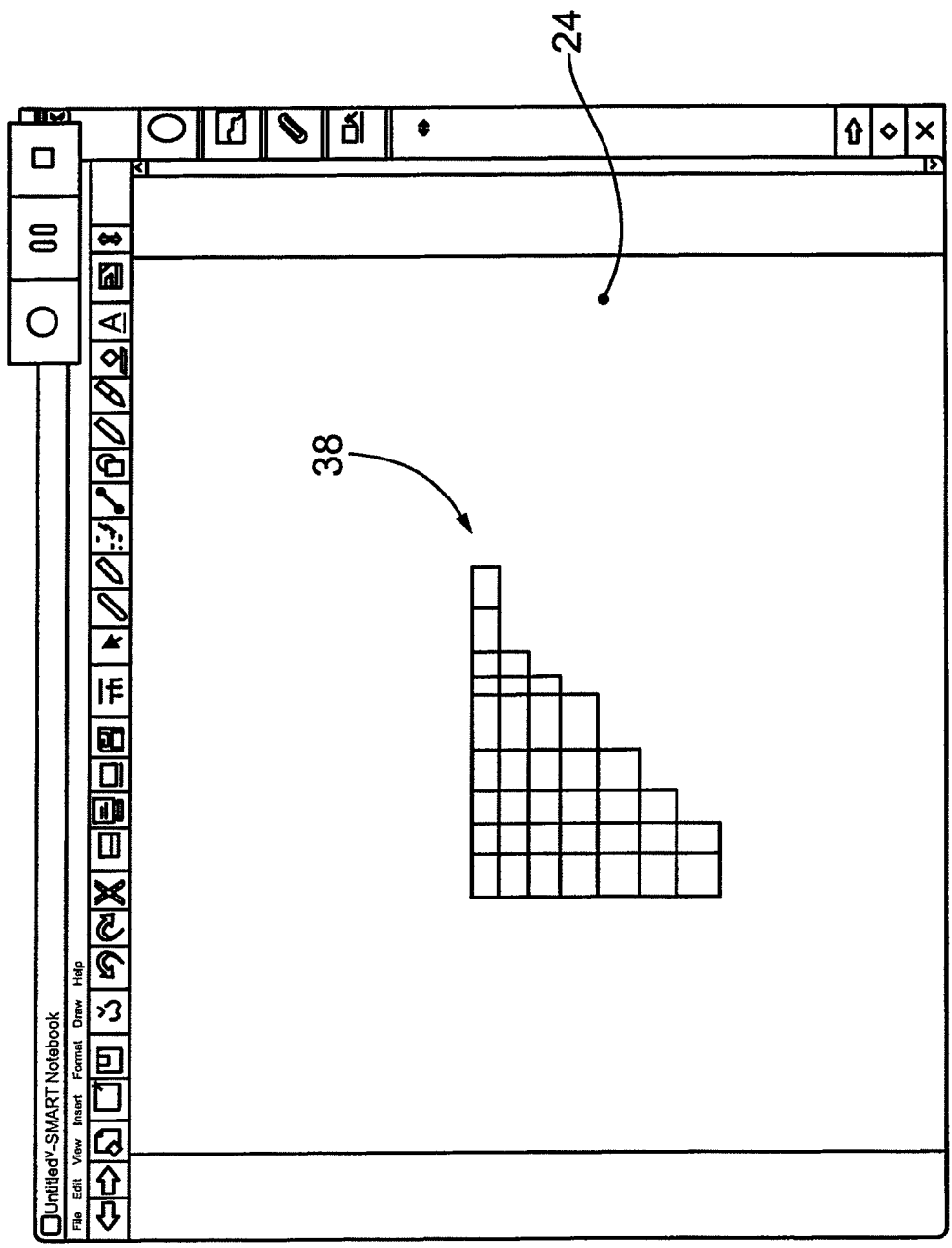
Figure 4B:
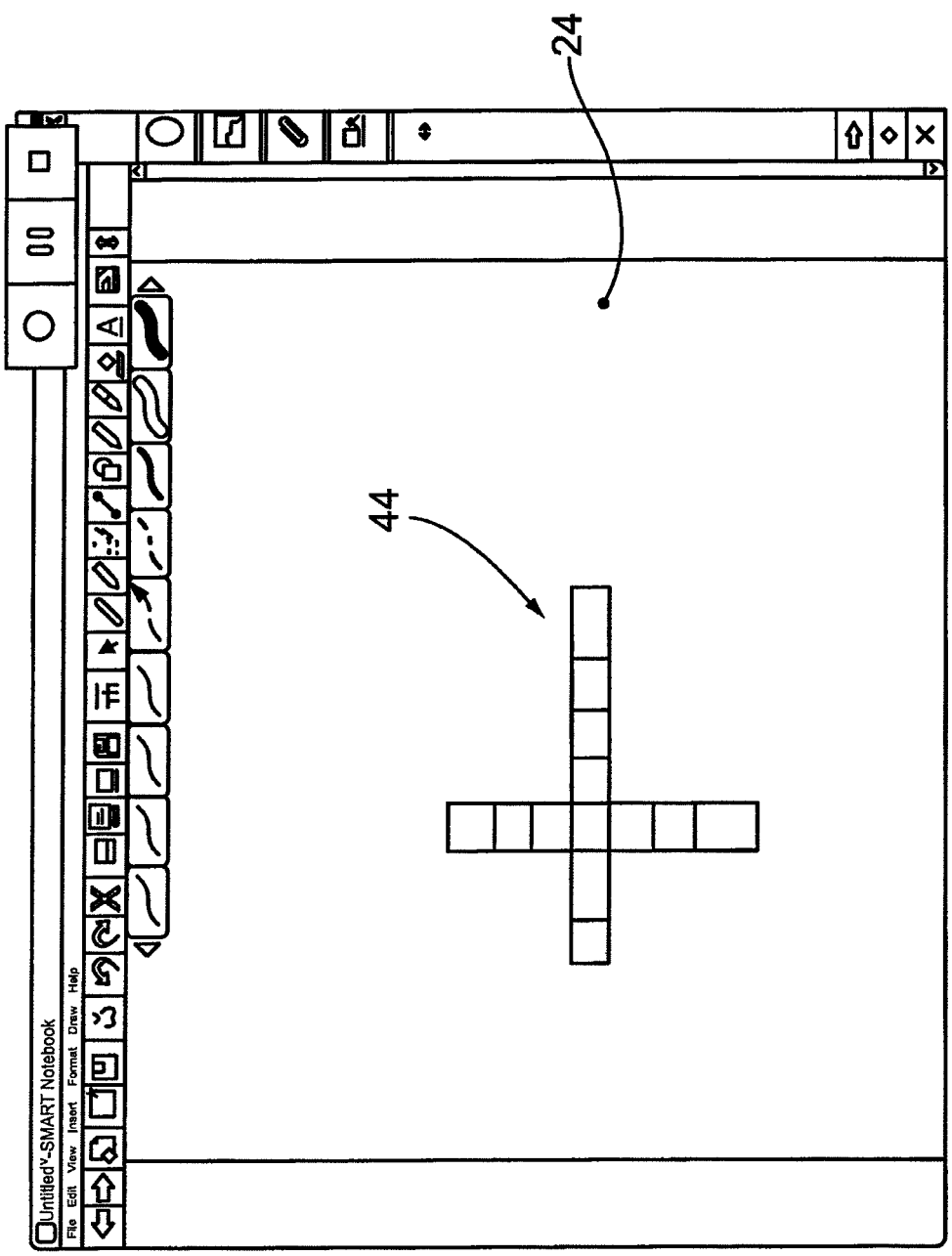

FIGS. 3a to 3c and FIGS. 4a and 4b show irregular shaped hand-drawn tables that have been input on the canvas page 24 of the graphical user interface 20 and then recognized by invoking the hand-drawn table recognizing tool 16. As can be seen in FIGS. 3a to 3c, each row of the hand-drawn table 38 has a different number of cells. The resulting table object 40 has the same configuration as the hand-drawn table 38. In FIGS. 4a and 4b, the hand-drawn table 42 comprises one row of cells and one column of cells, with the row and column intersecting to form an offset "+". The resulting table object 44 has the same configuration as the hand-drawn table 42.

Figure 5A:
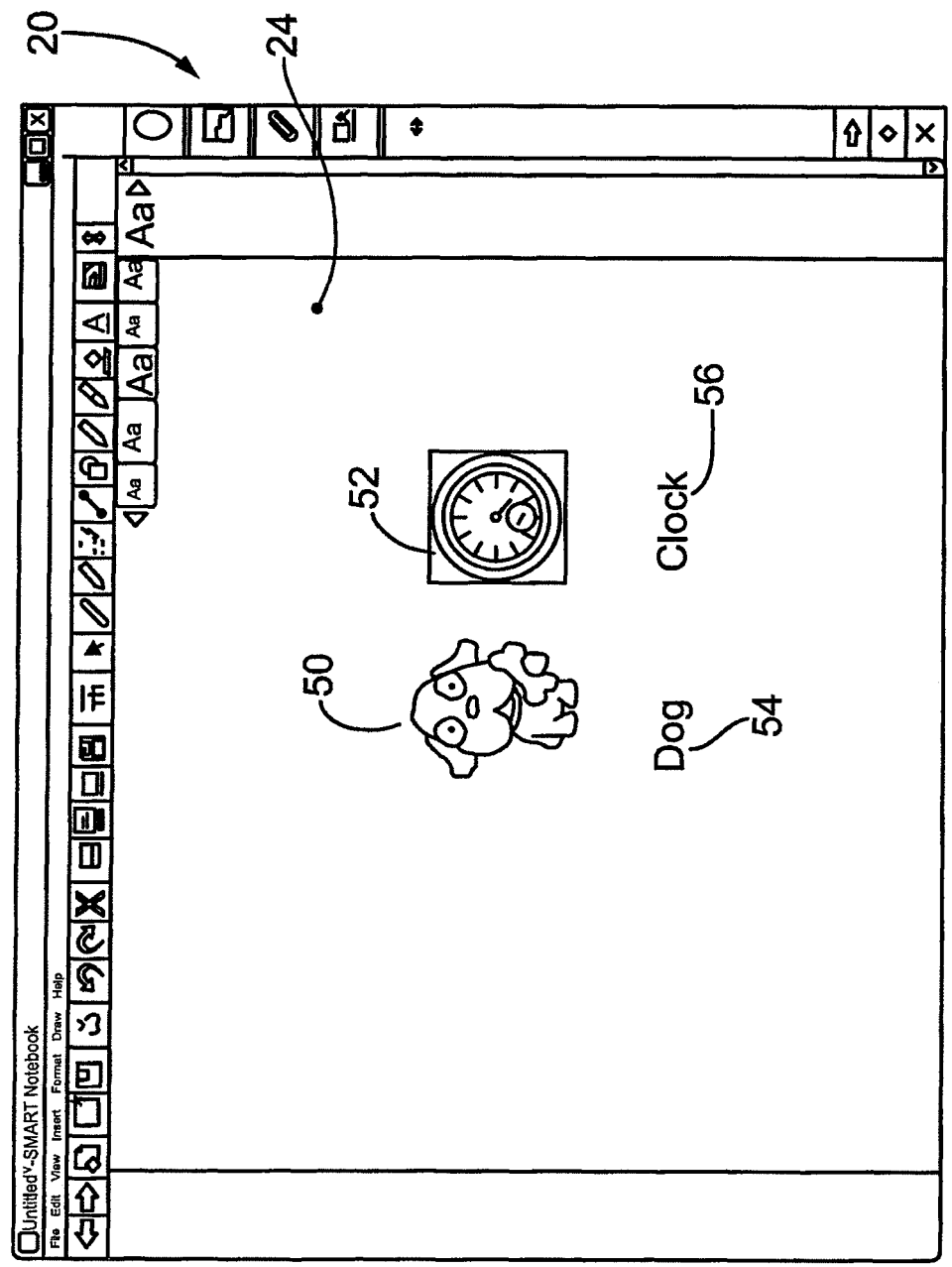
FIGS. 5a to 5d show the graphical user interface during hand-drawn table creation in the presence of picture and text objects and recognition of the created hand-drawn table.
Figure 5B:
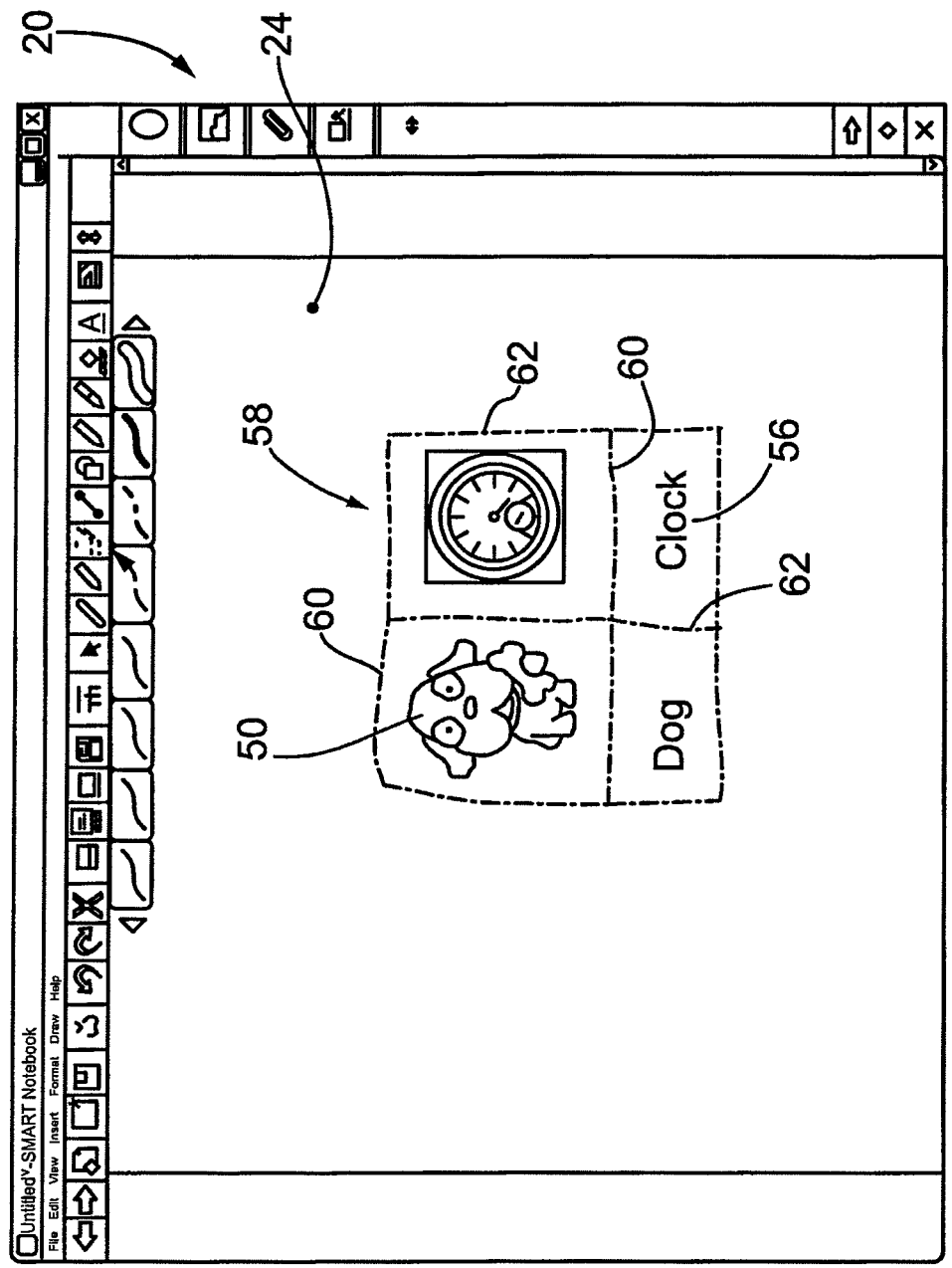
Figure 5C:
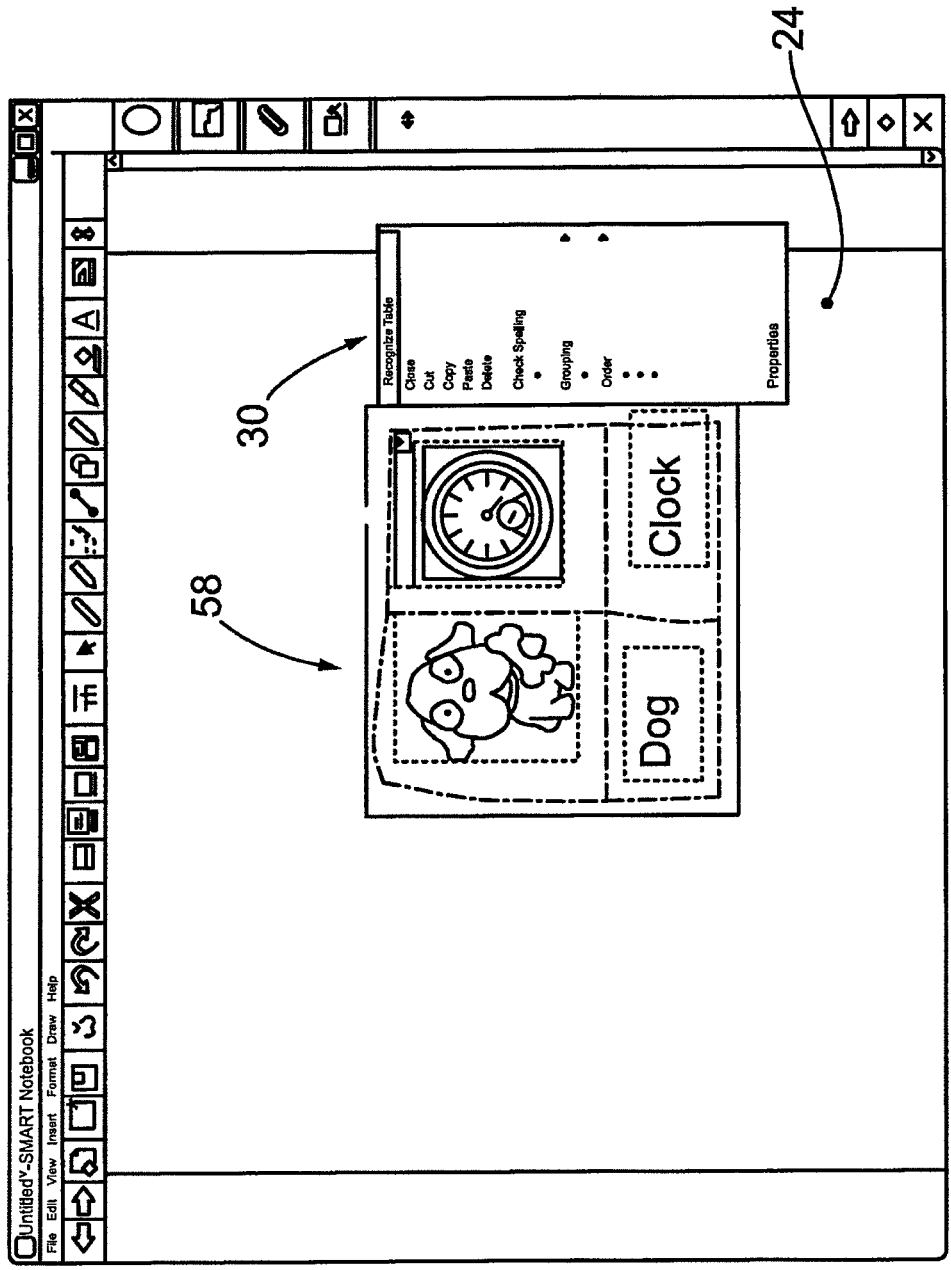
Figure 5D:
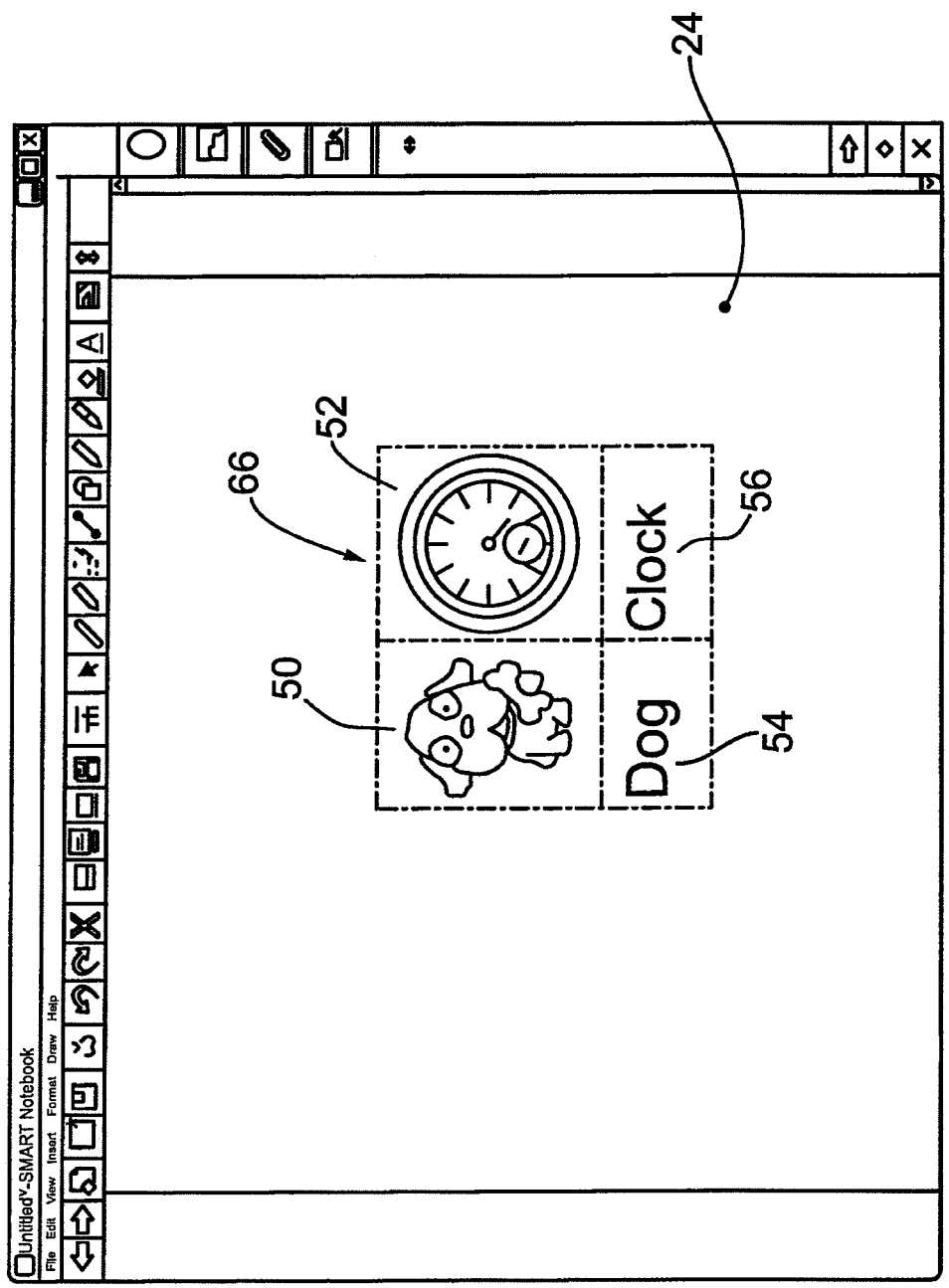

FIG. 5a shows side-by-side picture objects 50 and 52 and associated underlying text objects 54 and 56 that have been input on the canvas page 24 of the graphical user interface 20. In FIG. 5b, a hand-drawn table 58 comprising generally horizontal and vertical freeform lines 60 and 62 respectively has been input so that each of the picture objects 50, 52 and text objects 54, 56 is positioned in a different cell of the hand-drawn table 58. In FIGS. 5c and 5d, the hand-drawn table 58 is selected and the hand-drawn table recognizing tool 16 invoked, resulting in a corresponding table object 66 having the picture and text objects 50 to 56 as table cell content, being generated.

Figure 6:
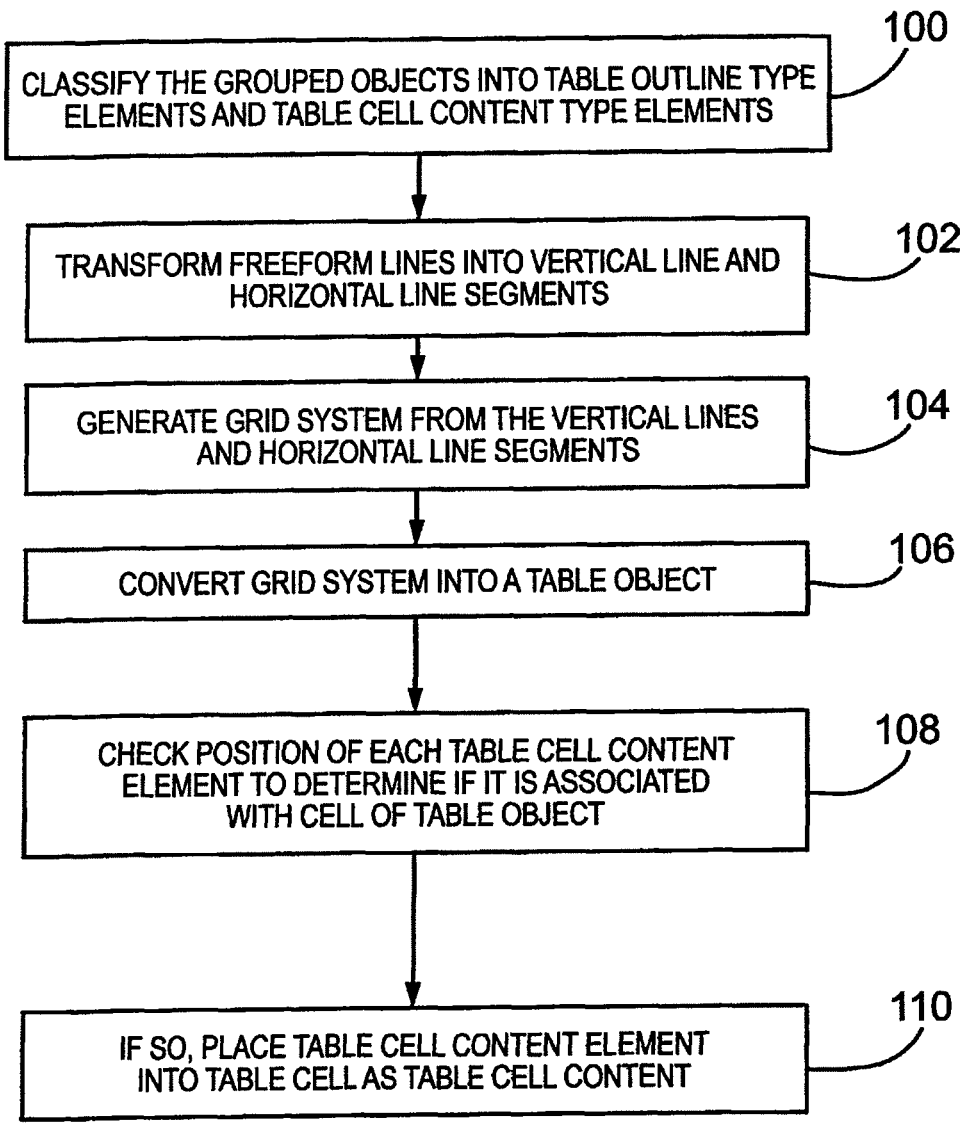
FIG. 6 is a flowchart showing the general steps performed during hand-drawn table recognition.

Turning now to FIG. 6, the general steps performed by the hand-drawn table recognizing tool 16 during hand-drawn table recognition are shown. As can be seen, when the hand-drawn table recognizing tool is invoked, the objects within the selected region of the graphical user interface encompassing the hand-drawn table are classified by the object classifier 16a into one of two groups, namely table outline elements and table cell content elements (step 100). The table outline elements in this embodiment comprise freeform or hand-drawn line objects (i.e. objects represented by a series of (x,y) coordinates and having no associated graphic content object). The table cell content elements comprise all other non-freeform line objects such as for example, Flash™ objects, shape objects, picture objects, text objects, numeric objects, non-line hand-drawn objects, creative pen objects etc. After the objects have been classified, the classified table outline elements are transformed into vertical and horizontal line segments by the freeform line object transformer 16b (step 102). A grid system is then generated by the grid system generator 16c based on the vertical and horizontal line segments, with the grid system comprising a grid list that stores the four corner coordinates of each grid in the grid system (step 104). The generated grid system is then converted into a table object by the table object generator 16d, with each cell of the table object having physical geometry location data corresponding to the four corner coordinates of its corresponding grid in the grid list (step 106). The position of each classified table cell content element is then examined to determine if it is deemed to be associated with a cell of the created table object (step 108). In particular, for each classified table cell content object, the center or other designated location on the classified table cell content object is checked to determine if it falls within a cell of the table object. If so, the classified table cell content element is placed into the table cell as table cell content (step 110).

Figure 7:
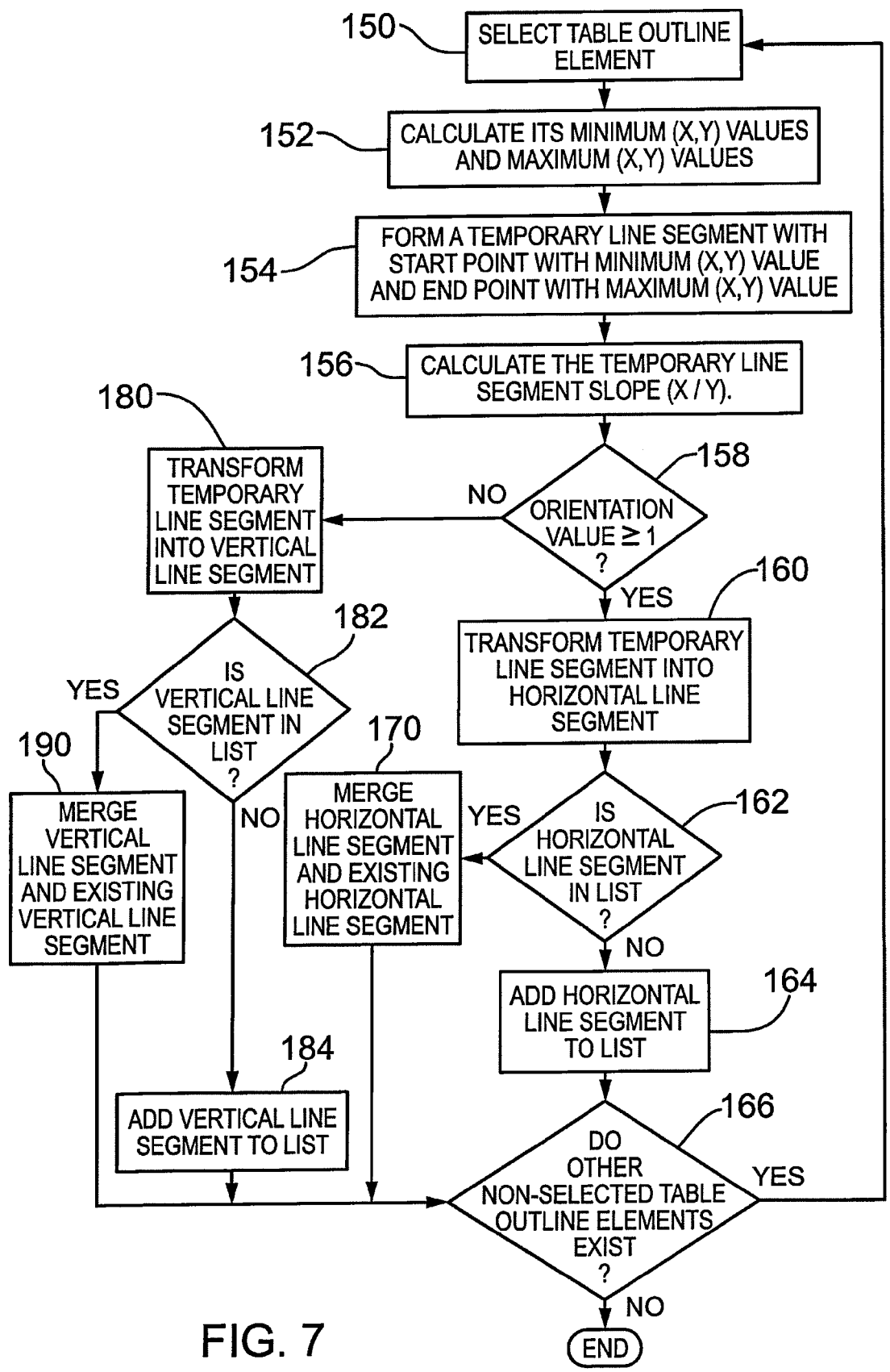
FIG. 7 is a flowchart showing the steps performed during transformation of table outline elements into vertical and horizontal line segments; a FIG. 8 is a flowchart showing the steps performed during grid system generation.

The steps performed during transformation of the table outline elements into vertical and horizontal line segments (step 102 of FIG. 6) are better illustrated in FIG. 7. During this process, a classified table outline element is selected (step 150). The minimum $(x_{min}, y_{min})$ coordinates and the maximum $(x_{max}, y_{max})$ coordinates of the selected table outline element are then determined (step 152). A temporary line segment having a start point at the minimum $(x_{min}, y_{min})$ coordinates and an end point at the maximum $(x_{max}, y_{max})$ coordinates is created (step 154). An orientation value for the temporary line segment is calculated according to:

$$\frac{(x_{max} - x_{min})}{(y_{max} - y_{min})}$$

(step 156) and the orientation value is checked to determine if it is greater than or equal to one (1) (step 158).

If the orientation value of the temporary line segment is greater than or equal to one, the temporary line segment is transformed into a horizontal line segment extending from the minimum x coordinate value to the maximum x coordinate value and having a y coordinate value equal to $(y_{max}+y_{min})/2$ and denoted $y_{avg}$ (step 160). Thus, the horizontal line segment has a start point $(x_{min}, y_{avg})$ and an end point $(x_{max}, y_{avg})$. The horizontal line segment is then compared to a horizontal line segment list to determine if the horizontal line segment is located at substantially the same y coordinate position as a horizontal line segment that already exists in the horizontal line segment list (step 162). In this embodiment, the horizontal line segment is deemed to be at the same y coordinate position as an existing horizontal line segment if the y coordinate of the horizontal line segment is within ten (10) pixels of the y coordinate of an existing horizontal line segment. If the horizontal line segment is deemed to be at the same y coordinate position as an existing horizontal line segment, the start point and end point of the horizontal line segment are compared with the start point and end point of that existing horizontal line segment to determine if the horizontal line segment and the existing horizontal line segment overlap. The horizontal line segment and the existing horizontal line segment are deemed to overlap if one of the following conditions holds true:

$$XE_{min} \leq X_{min} \leq XE_{max}$$

$$XE_{min} \leq X_{max} \leq XE_{max}$$

$$X_{min} \leq XE_{min} \leq X_{max}$$

$$X_{min} \leq XE_{max} \leq X_{max}$$

where:

$XE_{min}$ and $XE_{max}$ are the x coordinates of the start and end points respectively of the existing horizontal line segment; and $X_{min}$ and $X_{max}$ are the x coordinates of the start and end points respectively of the horizontal line segment.

If the horizontal line segment is determined not to overlap with the existing horizontal line segment, the horizontal line segment is added to the horizontal line segment list (step 164). A check is then made to determine if any other classified table outline element exists that has not been selected (step 166). If no non-selected classified table outline element exists, the process is deemed completed. Otherwise, the process reverts back to step (150) and the next classified table outline element is selected.

At step 162, if the horizontal line segment is determined to overlap with the existing horizontal line segment, the horizontal line segment and existing horizontal line segment are merged to update the start point and end point of the existing horizontal line segment in the horizontal line segment list (step 170). During merging, the start point of the horizontal line segment is checked to determine if it is smaller than the start point of the existing horizontal line segment and the end point of the horizontal line segment is checked to determine if it is greater than the end point of the existing horizontal line segment. If the start point of the horizontal line segment is smaller, the start point of the horizontal line segment is used to overwrite the start point of the existing horizontal line segment in the horizontal line segment list. If the end point of the horizontal line segment is greater, the end point of the horizontal line segment is used to overwrite the end point of the existing horizontal line segment in the horizontal line segment list.

Once the horizontal line segment and existing horizontal line segment have been merged at step 170, the process proceeds to step 166 where a check is made to determine if any other classified table outline element exists that has not been selected.

As step 158, if the orientation value of the temporary line segment is less than one, the temporary line segment is transformed into a vertical line segment extending from the minimum y coordinate value to the maximum y coordinate value and having an x coordinate value equal to $(x_{max}+x_{min})/2$ and denoted $x_{avg}$ (step 180). Thus, the vertical line segment has a start point $(x_{avg}, y_{min})$ and an end point $(x_{avg}, y_{max})$. The vertical line segment is then compared to a vertical line segment list to determine if the vertical line segment is located at substantially the same x coordinate position as a vertical line segment that already exists in the vertical line segment list (step 182). In this embodiment, the vertical line segment is deemed to be at the same x coordinate position as an existing vertical line segment if the x coordinate of the vertical line segment is within ten (10) pixels of the x coordinate of an existing vertical line segment. If the vertical line segment is deemed to be at the same x coordinate position as an existing vertical line segment, the start point and end point of the vertical line segment are compared with the start point and end point of that existing vertical line segment to determine if the vertical line segment and existing vertical line segment overlap. The vertical line segment and the existing vertical line segment are deemed to overlap if one of the following conditions holds true:

$$YE_{min} \leq Y_{min} \leq YE_{max}$$

$$YE_{min} \leq Y_{max} \leq YE_{max}$$

$$Y_{min} \leq YE_{min} \leq Y_{max}$$

$$Y_{min} \leq YE_{max} \leq Y_{max}$$

where:
  $YE_{min}$ and $YE_{max}$ are the y coordinates of the start and end points respectively of the existing vertical line segment; and
  $Y_{min}$ and $Y_{max}$ are the y coordinates of the start and end points respectively of the vertical line segment.

If the vertical line segment is determined not to overlap with existing vertical line segment, the vertical line segment is added to the vertical line segment list (step 184) and the process proceeds to step 166 where check is made to determine if any other classified table outline element exists that has not been selected.

At step 182, if the vertical line segment is determined to overlap with the existing vertical line segment, the vertical line segment and existing vertical line segment are merged to update the start point and end point of the existing vertical line segment in the vertical line segment list (step 190). During merging, the start point of the vertical line segment is checked to determine if it is smaller than the start point of the existing vertical line segment and the end point of the vertical line segment is checked to determine if it is greater than the end point of the existing vertical line segment. If the start point of the vertical line segment is smaller, the start point of the vertical line segment is used to overwrite the start point of the existing vertical line segment. If the end point of the vertical line segment is greater, the end point of the vertical line segment is used to overwrite the end point of the existing vertical line segment.

Once the vertical line segment and existing vertical line segment have been merged at step 190, the process proceeds to step 166 where a check is made to determine if any other classified table outline elements exists that has not been selected.

Figure 8:
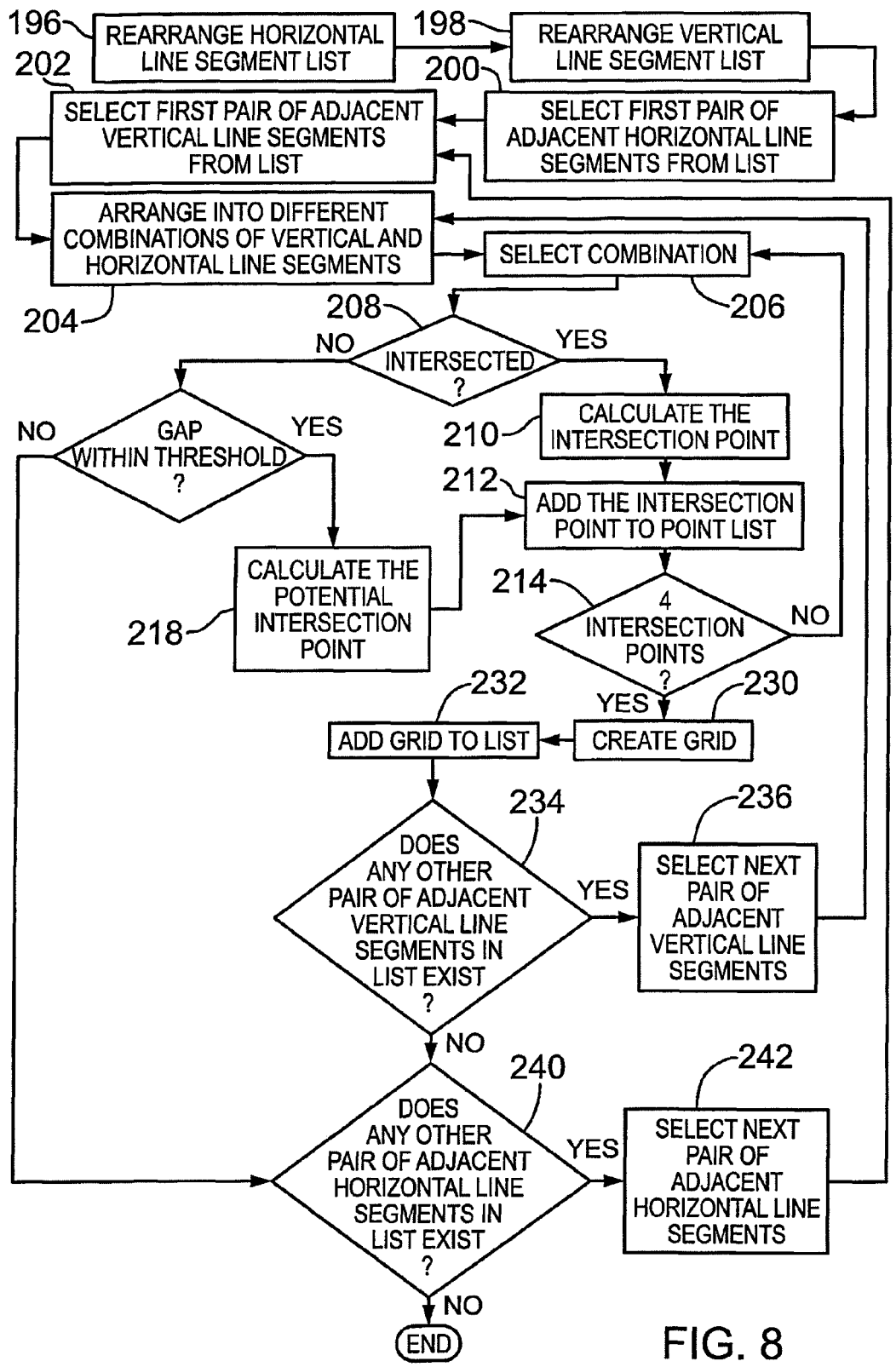

The steps performed during generation of the grid system (step 104 in FIG. 6) are better illustrated in FIG. 8. The horizontal line segments in the horizontal line segment list are arranged from top to bottom so that the horizontal line segment having the highest y coordinate is at the beginning of the list and the horizontal line segment having the lowest y coordinate is at the end of the list (step 196). The vertical line segments in vertical line segment the list are arranged from left to right so that the vertical line segment having the lowest x coordinate is at the beginning of the list and the vertical line segment having the highest x coordinate is at the end of the list (step 198). The first pair of adjacent horizontal line segments is then selected from the horizontal line segment list (step 200) and the first pair of adjacent vertical line segments is selected from the vertical line segment list (step 202). The selected horizontal and vertical line segments are then arranged to form four (4) different combinations of line segments with each combination comprising one horizontal line segment and one vertical line segment (step 204). A first combination of vertical and horizontal line segments is then selected (step 206) and the vertical and horizontal line segments of the selected combination are checked to determine if they intersect (step 208).

If the vertical and horizontal line segments of the selected combination intersect, the intersection point is calculated (step 210) and the calculated intersection point is added to an intersection point list (step 212). A check is then made to determine if the intersection point list comprises four (4) intersection points (step 214). If not, the process reverts back to step 206 and the next combination of vertical and horizontal lines segments is selected.

At step 208, if the vertical line segment and horizontal line segment of the selected combination do not intersect, a check is made to determine if the gap separating the horizontal and vertical line segments of the selected combinations is within a threshold, in this example one (1) pixel (step 216). If the gap separating the horizontal and vertical line segments is within the threshold, the horizontal and vertical line segments are deemed to intersect and the effective intersection point is calculated (step 218). The process then proceeds to step 212 where the calculated effective intersection point is added to the intersection point list.

At step 214, if the intersection point list comprises four intersection points, a grid is created having corners corresponding to the (x,y) coordinates of the four intersection points (step 230) and the grid is added to the grid system list (step 232). Following this, a check is made to determine if another pair of adjacent vertical line segments exists in the vertical line segment list that has not been selected (step 234). If another pair of non-selected adjacent vertical line segments exists in the vertical line segment list, the next pair of adjacent vertical line segments in the vertical line segment list is selected (step 236) and the process reverts back to step 204. In this manner, each pair of adjacent vertical line segments in the vertical line segment list is compared to the selected pair of adjacent horizontal line segments to determine the intersection points therebetween and thereby determine the coordinates of a row of horizontal grids in the grid system.

At step 234, if no pair of non-selected adjacent vertical line segments exists, a check is made to determine if another pair of adjacent horizontal line segments exists in the horizontal line segment list that has not been selected (step 240). If another pair of non-selected adjacent horizontal line segments exists in the horizontal line segment list, the next pair of adjacent horizontal line segments in the horizontal line segment list is selected (step 242) and the process reverts back to step 202. Steps 202 to 236 are then repeated for the next pair of adjacent horizontal line segments to determine the intersection points between the vertical line segments and the horizontal line segments and thereby determine the coordinates of the next row of horizontal grids in the grid system. At step 240, if no pair of non-selected adjacent horizontal line segments exists, the grid system generation process is deemed complete.

At step 216, if the gap separating the horizontal and vertical line segments of the selected combination is beyond the threshold, the process proceeds to step 240 to determine if another pair of adjacent horizontal line segments exists in the horizontal line segment list that has not been selected.

Once the table object has been created and table cell content placed in the cells of the table object, if appropriate, the table object can be further processed depending on the table cell content placed in the cells. For example, if numeric objects are placed in the cells of the table object, the table object can be treated as a spreadsheet and operations performed similar to other spreadsheet programs such as for example Excel™. In this case, placing a hand-drawn object resembling a "+" in the cell at the end of one of the cell rows or columns invokes a summation operation so that the sum of the numeric objects in that one row or column is calculated and displayed in the cell having the "+" object therein. Of course, other operations can be invoked by placing objects representing those operations in cells of the table object.

Although particular values for the thresholds described above are provided, those of skill in the art will appreciate that the threshold values may be changed to relax or tighten the process to suit the particular environment in which the hand-drawn table recognizing tool 16 is employed. Also, rather than calculating the run versus rise of each table outline element, other techniques can be employed to determine the orientation of the freeform lines. In addition, although the above embodiment describes freeform line objects as being recognized as the table outline elements, if desired, selected combinations of freeform line objects and shape objects may also be recognized as table outline elements.

If desired, when each table outline element is selected at step 150, the table outline element can be processed to make a determination as to whether the table outline element represents a table line or other non-table line such as handwriting. This can be achieved for example by analyzing maximum deviations of the line coordinates in given directions or by calculating derivatives. Alternatively, the user may be provided with the ability to designate non-table lines using an input gesture.

In the above-embodiment, all freeform line objects within the selected region of the graphical user interface encompassing the hand-drawn table are treated as table outline elements. In some situations, the hand-drawn table may however include hand-drawn table cell content. In order to avoid such hand-drawn table cell content from being lost during the table recognition process, it is necessary to differentiate between freeform line objects representing table outline elements and other freeform line objects.

Figure 9:
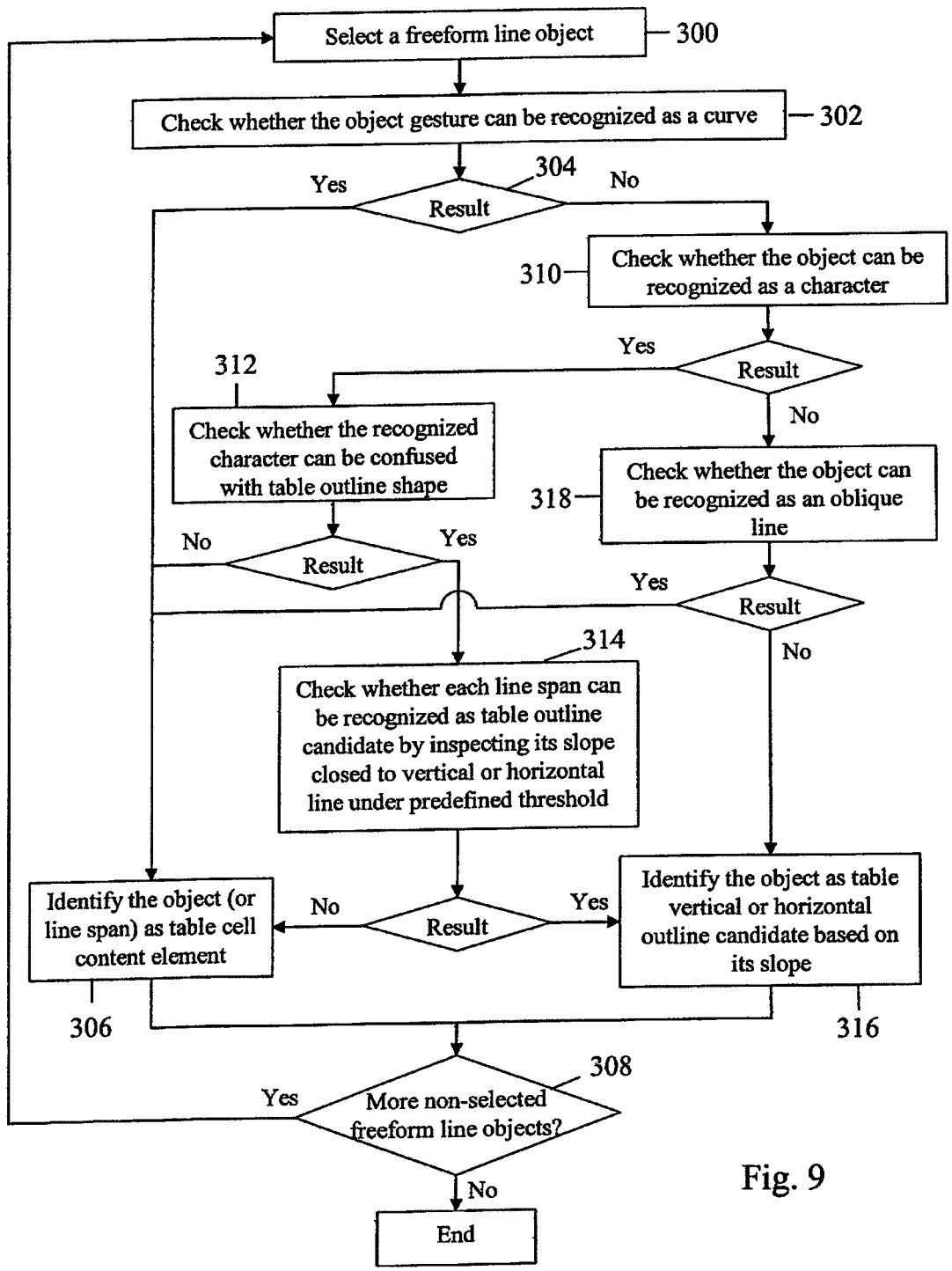
FIGS. 9 and 10 are flowcharts showing the steps performed by another embodiment of a hand-drawn table recognition tool.
Figure 10:
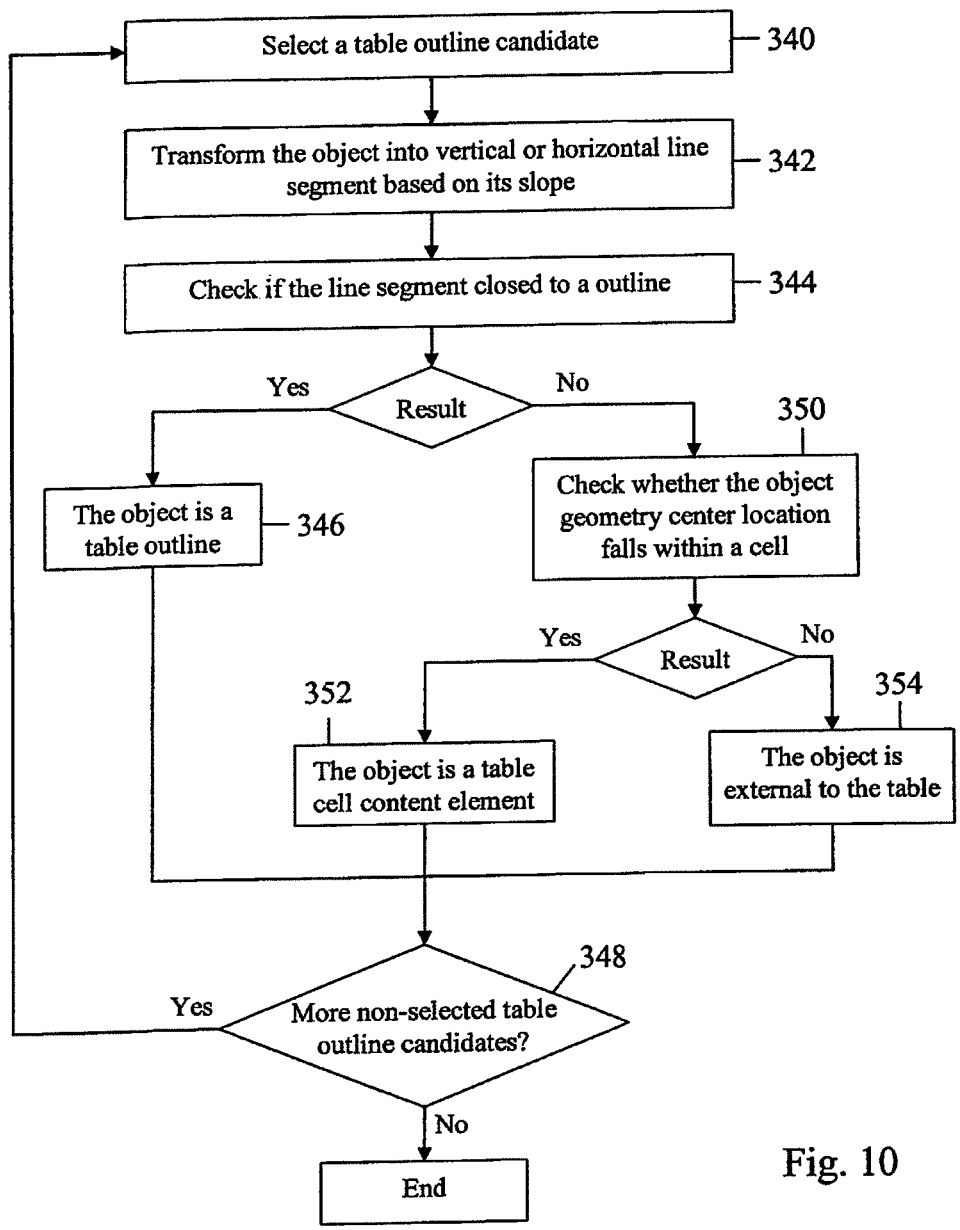
Figure 11A:
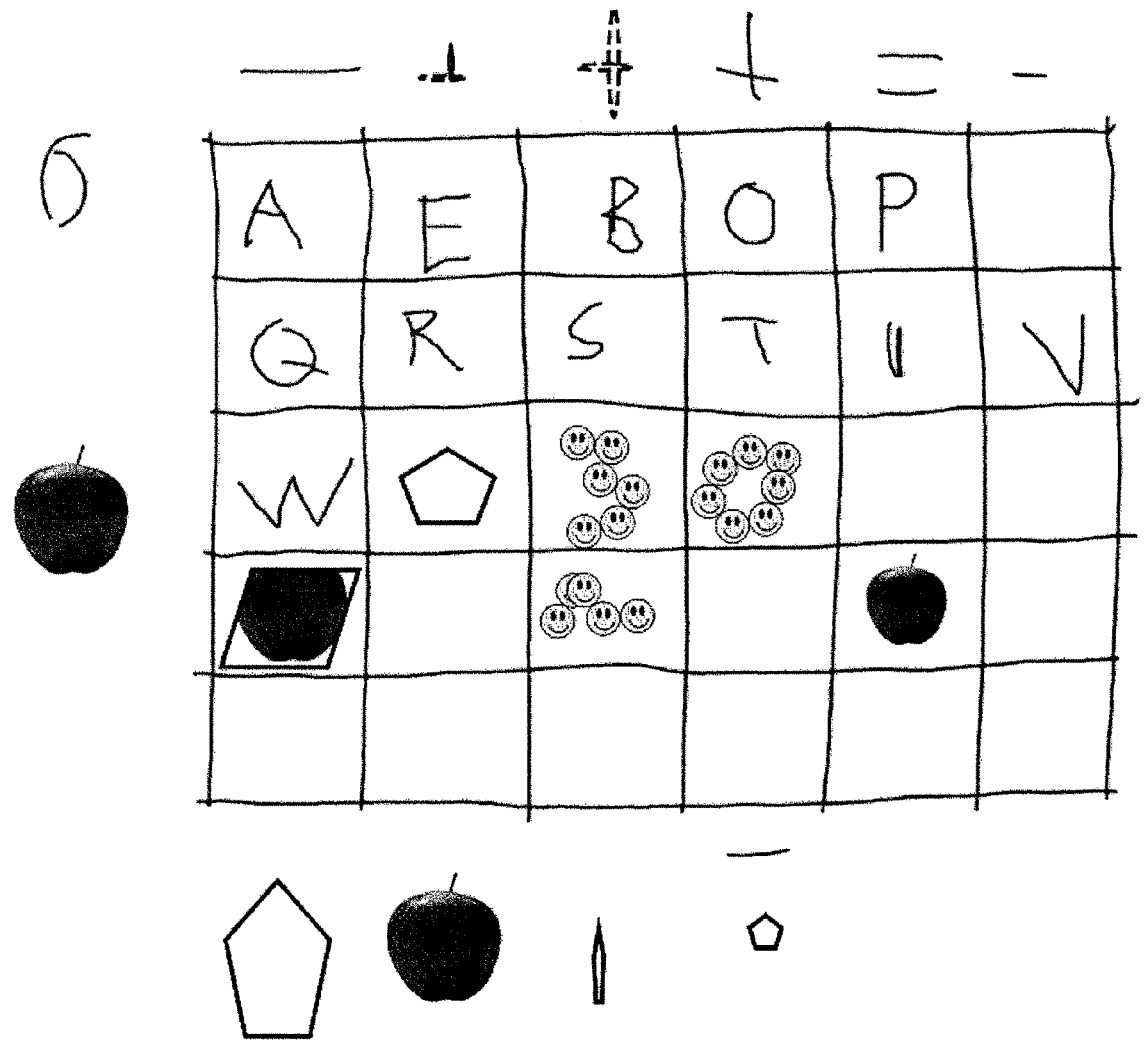
Figure 11B:
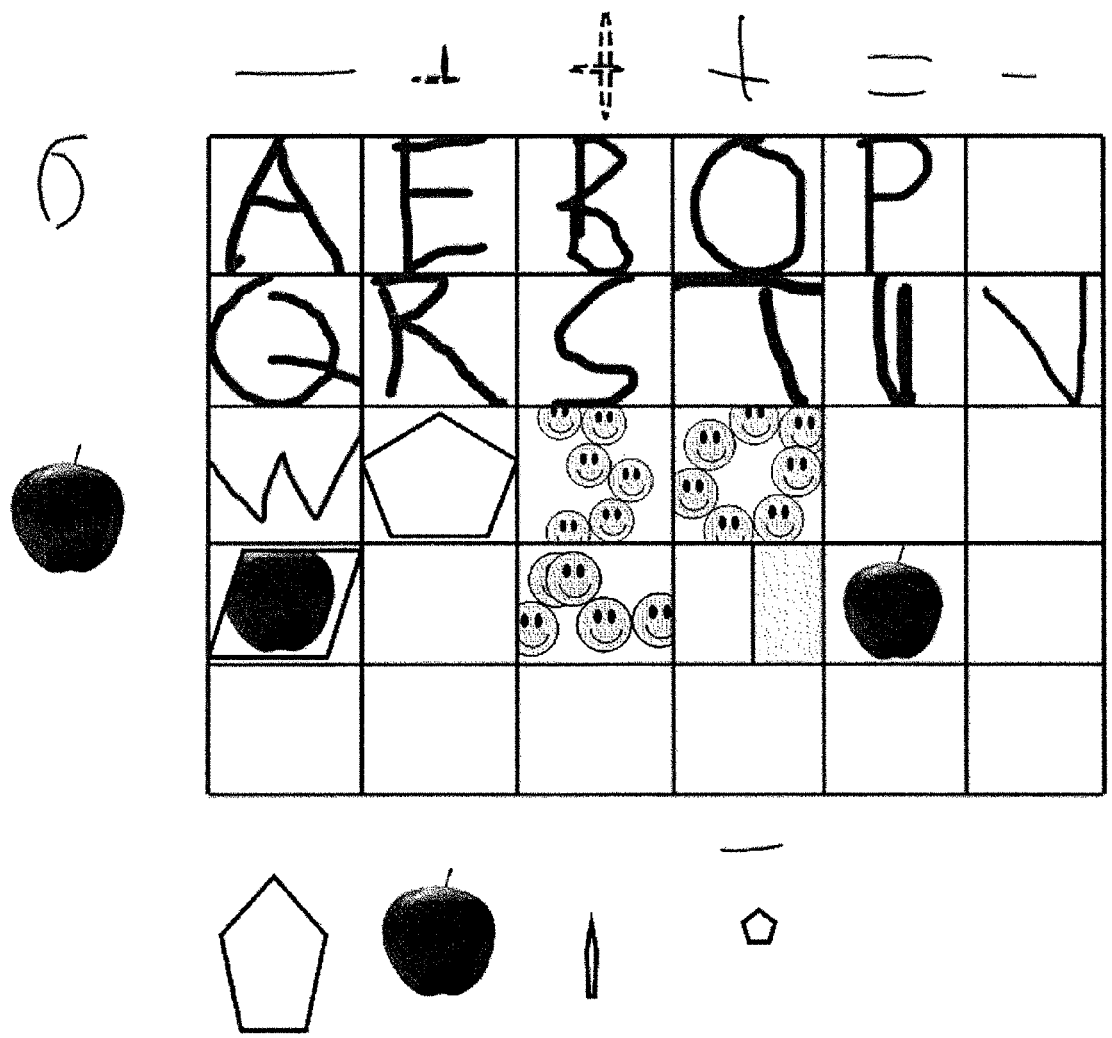
Figure 12B:
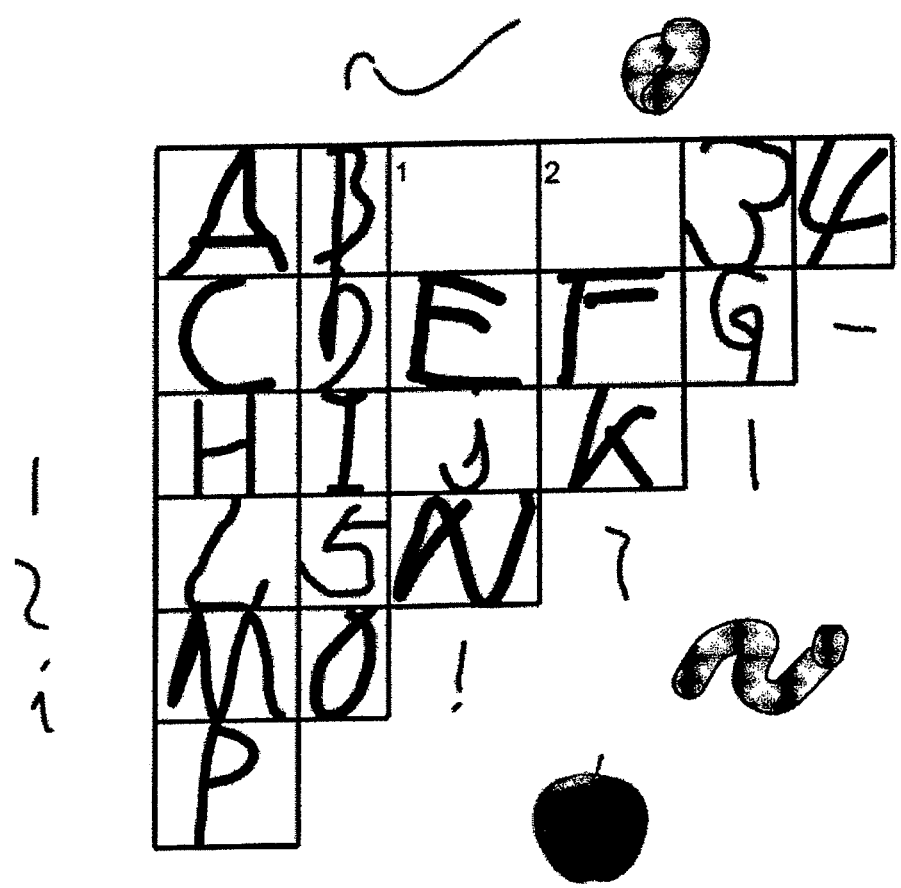
Figure 13A:
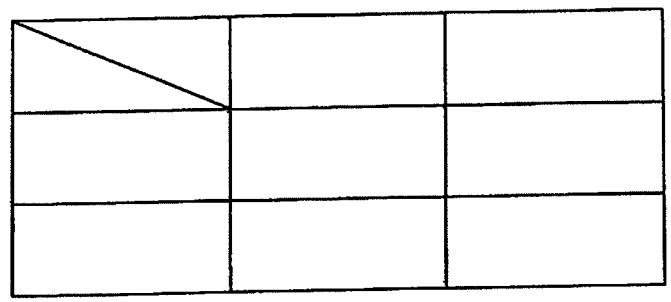
FIGS. 13a to 13g show table objects with table object cells subdivided by one or more oblique lines.
Figure 13B:
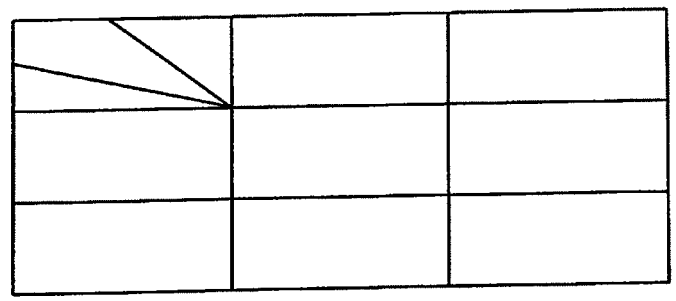
Figure 13C:
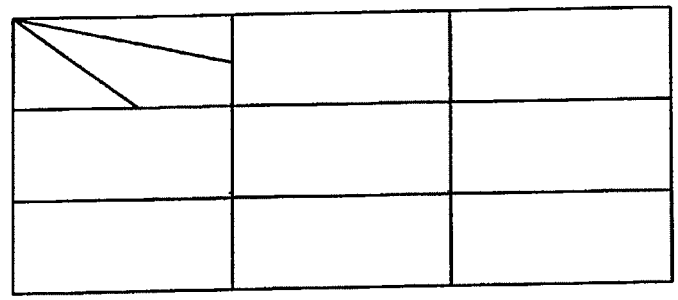
Figure 13D:
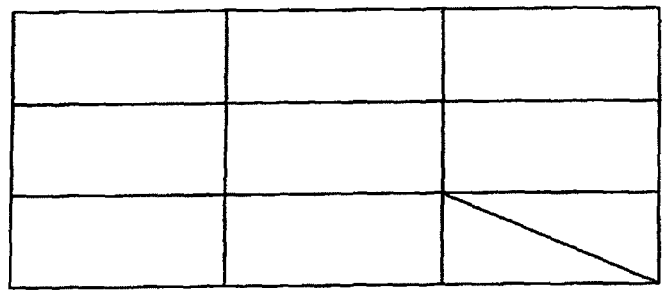
Figure 13E:
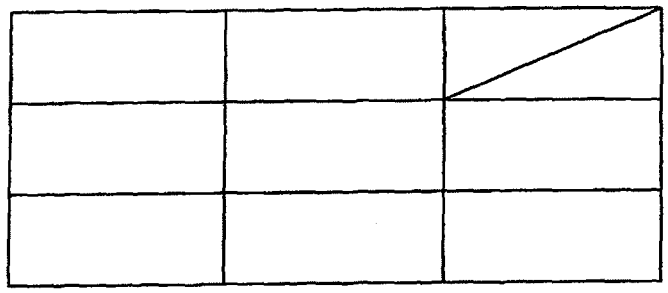
Figure 13F:
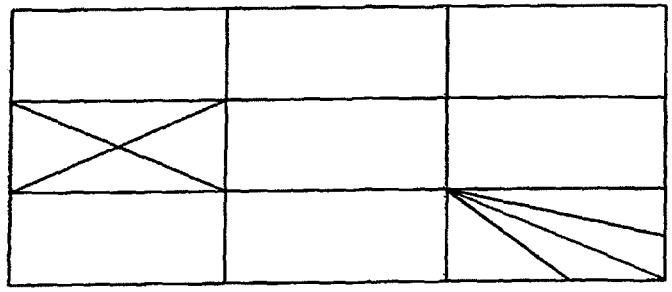
Figure 13G:
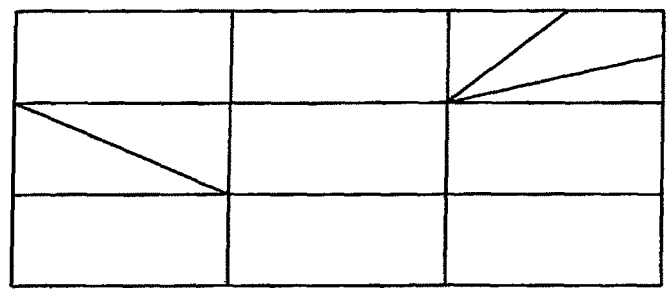

Turning to FIGS. 9 and 10, the steps performed during an alternative embodiment of a hand-drawn table recognition tool are shown. In this embodiment, the hand-drawn table recognition tool differentiates between freeform line objects representing table outline elements and other freeform line objects. When the hand-drawn table recognition tool is invoked, similar to the previous embodiment, the objects within the selected region of the graphical user interface encompassing the hand-drawn table are classified by the object classifier 16a into freeform or hand-drawn line objects and non-freeform line objects. Once the freeform line objects have been identified, one of the freeform line objects is initially selected (step 300) and a check is made to determine if the selected freeform line object can be recognized as a curve (step 302). If so, the selected freeform line object is identified as a table cell content element (step 306). A check is then made to determine if any other non-selected freeform line objects exist (step 308). If so, the process reverts back to step 300 and the next freeform line object is selected. Otherwise the process ends.

At step 302, if the selected freeform line object cannot be recognized as a curve, a check is made to determine if the selected freeform line object can be recognized as a character such as for example an Arabic letter, ideographic character, symbol etc. (step 310). If the selected freeform line object can be recognized as a character, a check is made to determine if the selected freeform line object resembles a character that can be confused with the shape of the table outline (step 312). For example, the selected freeform line object may be examined to determine if it resembles a character consisting of horizontal and/or vertical line segments such as for example the English letters "T", "E", "F" and "I", the Chinese characters 上", "干", "日", "口", and "十" or any other letter, ideographic character or symbol that resembles a table outline shape. If not, the process proceeds to step 306 and the selected freeform line object is identified as a table cell content element. At step 312, if the selected freeform line object resembles a character that can be confused with the shape of the table outline, the slope of each line segment making up the selected freeform line object is examined to determine if the line segment resembles either a vertical line or a horizontal line (step 314). If one or more of the line segments forming the selected freeform line object do not resemble a vertical or horizontal line, the process proceeds to step 306 and the selected freeform line object is identified as a table cell content element. At step 314, if each line segment forming the selected freeform line object resembles a vertical or horizontal line, each line segment of the selected freeform line object is identified as either a horizontal or vertical table outline candidate based on its slope and is added to a table outline candidate list (step 316). The process then proceeds to step 308 where check is made to determine if any other non-selected freeform line objects exist.

At step 310, if the selected freeform line object cannot be recognized as a character, a check is made to determine if the selected freeform line object resembles an oblique line (step 318). If so, the process proceeds to step 306 and the selected freeform line object is identified as a table cell content element. If not, the freeform line object is identified as either a horizontal or vertical table outline candidate based on its slope and is added to the table outline candidate list. The process then proceeds to step 308 where a check is then made to determine if any other non-selected freeform line objects exist.

Once the table outline candidates have been determined and the table outline candidate list is complete, the table outline candidates are processed by the freeform line object transformer 16b, grid system generator 16c and table object generator 16d in the manner previously described in order to generate a table object representing the hand-drawn table. After the table object has been created, the table outline candidates in the table outline candidate list are examined to determine if the table outline candidates in fact represent part of the generated table object, represent table cell content or represent freeform content that is outside of the generated table object.

During this process, a table outline candidate is selected (step 340) and the selected table outline candidate is transformed by the freeform line object transformer 16a into vertical and/or horizontal line segments (step 342). For each vertical line segment, a check is made to determine if the distance between it and the closest vertical segment of the table object is within a threshold separation value and if the start and end points of the vertical line segment and vertical segment of the table object overlap (step 344). Also, for each horizontal line segment of the selected table outline candidate, a check is made to determine if the distance between it and the closest horizontal segment of the table object is within the threshold separation value and if the start and end points of the horizontal line segment and horizontal segment of the table object overlap (step 344). If the above checks hold true, the table outline candidate is assumed to be part of the table object and is discarded (step 346). A check is then made to determine if any other non-selected table outline candidates exist (step 348). If so, the process reverts back to step 340 and the next table outline candidate is selected. Otherwise the process ends.

At step 344, if the checks do not hold true, a check is made to determine whether the center location of the table outline candidate geometry falls within a cell of the table object (step 350). If so, the table outline candidate is recognized as a table cell content element (step 352) and the process proceeds to step 348 where a check is then made to determine if any other non-selected table outline candidates exist. At step 350, if the center location of the table outline geometry does not fall within a cell of the table object, the table outline candidate is deemed to be a freeform line object external to the hand-drawn table (step 354). The process then proceeds to step 348 where a check is made to determine if any non-selected table outline candidates exist.

Similar to the previous embodiment, once the table object has been generated and the table outline candidates verified as either part of the table object or as internal or external table object content, the position of each table cell content element identified at step 306 is examined to determine if it is deemed to be associated with a cell of the generated table object. If so, the table cell content element is placed into the table cell as table cell content. If not, the table cell content element is deemed to be a content object external to the generated table object and is left in its original position.

FIGS. 11*a*, 11*b*, 12*a* and 12*b* show hand-drawn tables that have been input on the canvas page 24 of the graphical user interface 20 and then recognized by invoking the hand-drawn table recognition tool operating according to FIGS. 9 and 10. As can be seen, freeform line cell content in the hand-drawn tables is preserved.

If desired, the steps illustrated in FIG. 10 may be performed by the grid system generator 16*c* during generation of the grid system. In this case, when a grid point is generated, the two freeform line objects corresponding to the vertical and horizontal line segments that result in the generated grid point are marked as "used". After the table object is generated using the grid points, all freeform line objects corresponding to vertical and horizontal line segments that have been designated as "used" are discarded. The remaining freeform line objects are identified as content objects. The positions of the freeform line objects are used to determine if the freeform line objects represent table cell content or content objects external to the hand-drawn table.

In certain environments it is common to partition cells of a table using oblique lines. For example, FIGS. 13*a* to 13*g* show table objects having one or more cells partitioned by oblique lines. In these cases, rather than treating oblique lines as table cell content as in the above embodiment, it is desired to treat the oblique lines as table cell partitions so that each region of a table cell delineated by one or more oblique lines can receive its own table cell content.

Figure 14:
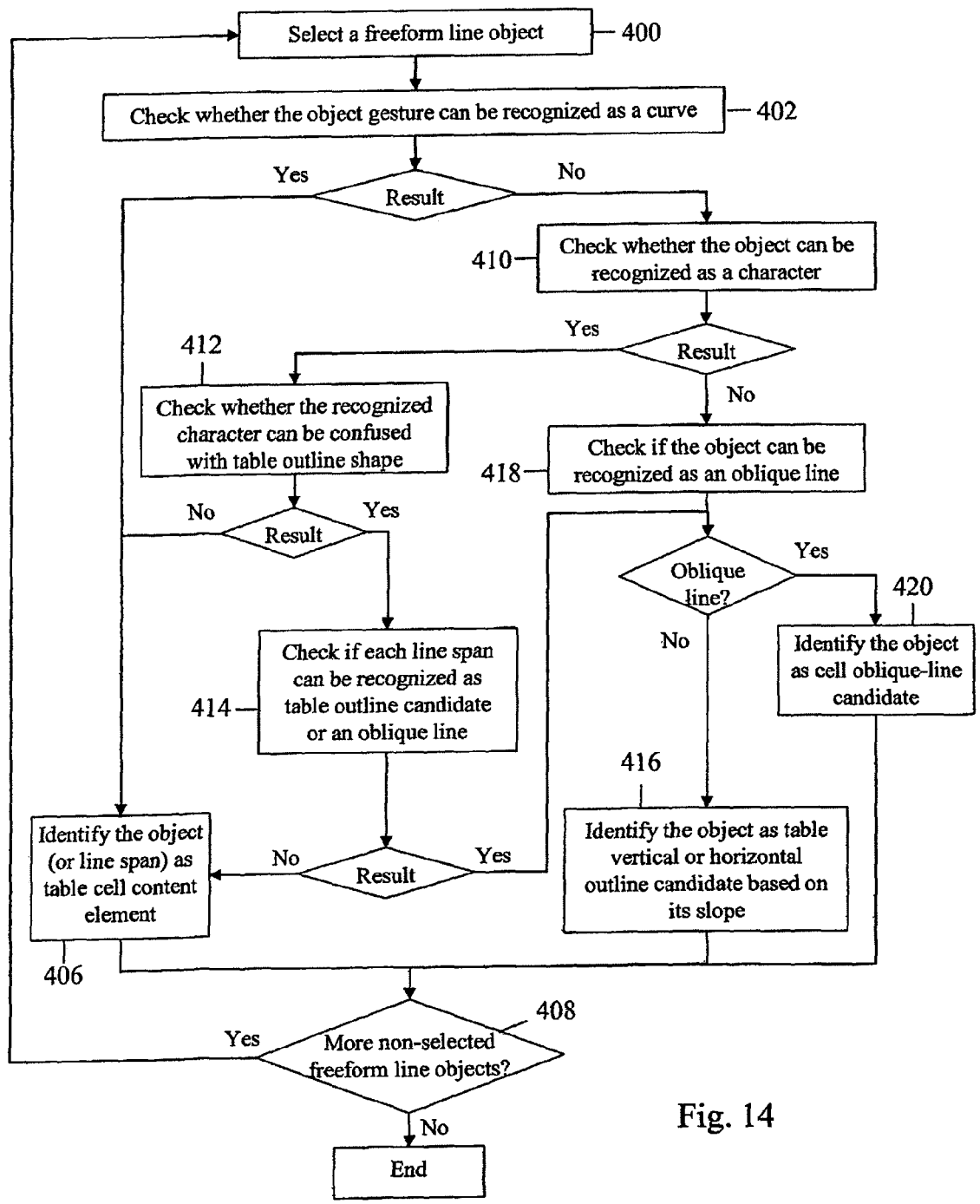
FIGS. 14 and 15 are flowcharts showing the steps performed by yet another embodiment of a hand-drawn table recognition tool.
Figure 15:
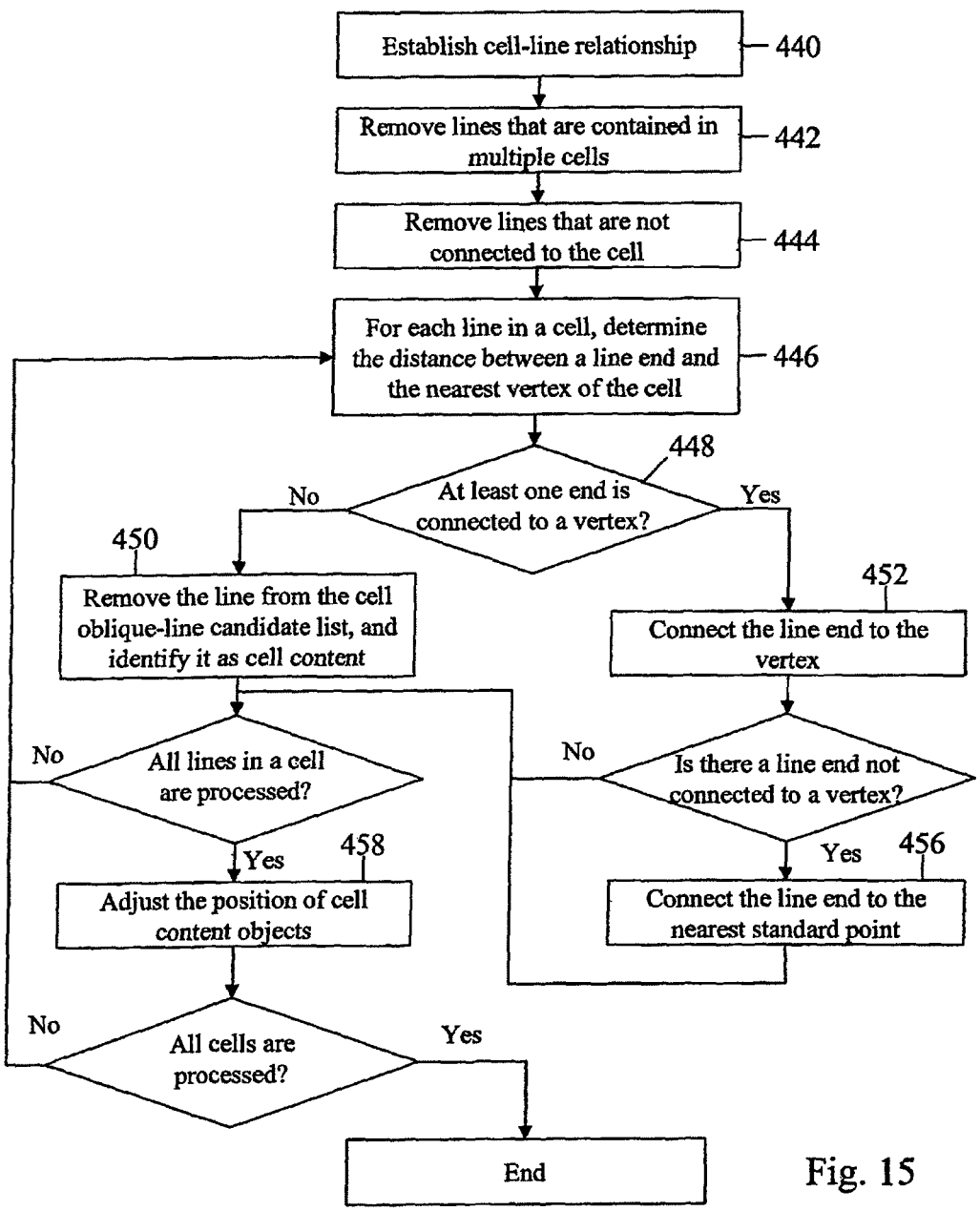

Turning to FIGS. 14 and 15, the steps performed by yet another embodiment of a hand-drawn table recognition tool are shown. In this embodiment, when the hand-drawn table recognition tool is invoked, objects when within the selected region of the graphical user interface encompassing the hand-drawn table are classified by the object classifier 16*a* into freeform or hand-drawn line objects and non-freeform line objects. Once the freeform line objects have been identified, one of the freeform line objects is selected (step 400) and a check is made to determine if the selected freeform line object can be recognized as a curve (steps 402). If so, the selected freeform line object is identified as a table cell content element (step 406). A check is then made to determine if any other non-selected freeform line objects exist (step 408). If so, the process reverts back to step 400 and the next freeform line object is selected. Otherwise the process ends.

At step 402, if the selected freeform line object cannot be recognized as a curve, a check is then made to determine if the selected freeform line object can be recognized as a character (step 410). If the selected freeform line object can be recognized as a character, a check is made to determine if the selected freeform line object resembles a character that can be confused with the shape of the table outline (step 412) such as for example those letters and characters identified previously with reference to the embodiment of FIGS. 9 and 10. If not, the process proceeds to step 406 and the selected freeform line object is identified as a table cell content element. If the selected freeform line object resembles a character that can be confused with the shape of the table outline, the slope of each line segment making up the selected freeform line object is examined to determine if the line segment resembles either a vertical line, a horizontal line or an oblique line (step 414). If one or more of the line segments making up the selected freeform line object do not resemble either vertical, horizontal or oblique lines, the process proceeds to step 406 and the selected freeform line object is identified as a table cell content element. If each line segment making up the selected freeform line object resembles either a vertical, horizontal or oblique line, each line segment of the selected freeform line object is identified as either a horizontal, vertical or oblique table outline candidate based on its slope (step 416). Each identified horizontal and vertical line segment is added to a table outline candidate list and each identified oblique line is added to a cell-oblique line candidate list. The process then proceeds to step 408 where a check is made to determine if any other non-selected freeform line objects exist.

At step 410, if the selected freeform line object cannot be recognized as a character, a check is made to determine if the selected freeform line object resembles an oblique line (step 418). If not, the freeform line object is identified as either a horizontal or vertical table outline candidate based on its slope and is added to the table outline candidate list (step 416). If the selected freeform line object resembles an oblique line at step 418, the table outline candidate is added to the cell-oblique line candidate list (step 420) and the process proceeds to step 408 where a check is then made to determine if any other non-selected freeform line objects exist.

Once the table outline candidates have been determined and the table outline candidate and cell-oblique line candidate lists have been completed, the table outline candidates in the table outline candidate list are processed in the manner previously described with reference to FIGS. 9 and 10 in order to generate a table object and to verify the table outline candidates as either part of the table object, table cell content or content external to the hand-drawn table.

The position of each table cell content element is then examined to determine if it is deemed to be associated with a cell of the generated table object. If so, the table cell content element is placed into the table cell as table cell content. If not, the table cell content object is deemed to be a content object external to the generated table object and is left in its original position.

Figure 16:
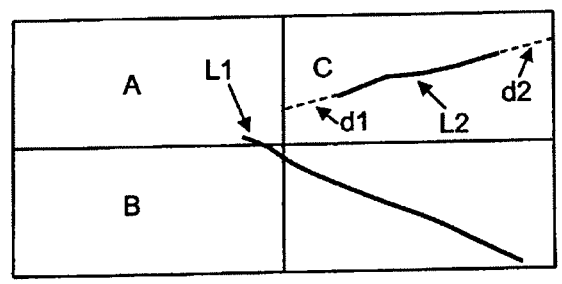
FIG. 16 shows a subset of table object cells and oblique line candidates.

With the above completed, the cell-oblique line candidate list is then processed to determine whether the oblique lines in the cell-oblique line candidate list represent table object cell partitions or content objects. During processing of the cell-oblique line candidate list, cell-oblique line relationships are firstly established (step 440). In this embodiment, an oblique line is deemed to be contained in a table cell if the length of the oblique line that falls into the table cell is larger than a threshold. For example, in FIG. 16, table cells A and B are considered not contain the oblique line L1. The threshold in this embodiment is a small fraction r of the length of the diagonal of the table cell and is predefined, e.g., ⅛ or 1/16. Thus, the threshold is only related to the size of the hand-drawn table and is not related to the size of the coordinate input device 12. Using such a threshold accommodates inaccuracies in the drawing of oblique lines while still maintaining the ability to recognize oblique lines correctly. With a slight computational cost, an adaptive fraction r may be used to compensate for the fact that when table cells are small the inaccuracy of hand-drawn oblique lines relative to the table cell size may be large. Such as adaptive fraction r is dynamically determined according to the ratio of the diagonal length of the table cell over the tip diameter of the pointer in pixels. If the ratio is large, a small fraction r, e.g., 1/16 or less, is used. If the ratio is small, a relatively larger fraction r, e.g., ⅛ or larger, is used.

After establishing the cell-oblique line relationships, oblique lines that are contained in multiple table cells are identified and removed from the cell-oblique line candidate list (step 442). Thereafter, oblique lines that are not connected to table cells are identified and removed from the cell-oblique line candidate list (step 444). During this process, using the same threshold as above, each oblique line is checked to determine if it is connected to a table cell. Referring again to FIG. 16, if the distance between an end of the oblique line to the nearest border of the table cell (d1 or d2) along the direction of the oblique line is larger than the threshold, the oblique line is recognized as a table cell content element, and is removed from the cell-oblique line candidate list.

Figure 17:
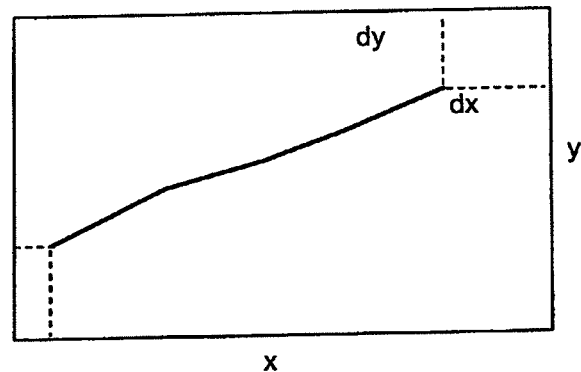
FIG. 17 shows a table object cell and an oblique line candidate.

Alternatively, the smallest distance between each end of the oblique line and the adjacent horizontal and vertical table cell borders may be used to determine if the oblique line is connected to the table cell. As illustrated in FIG. 17, connectivity c is calculated as:

$$c=\min(dx/x, dy/y)$$

If the connectivity c for either end of the oblique line is larger than the threshold fraction r, the oblique line is deemed not to be connected to the table cell, and is recognized as a table cell content element and removed from the cell-oblique line candidate list.

Following step 444, for each table cell that contains at least one oblique line, the table cell is processed to normalize the oblique line(s) contained in the table cell. In this embodiment, each oblique line must connect to at least one vertex of the table cell. Therefore, for each oblique line, the distance between each end of the oblique line and the nearest vertex of the table cell is calculated (step 446), and is then divided by the length of the diagonal of the table cell. The resultant ratios are then examined to determine if at least one end of the oblique line is connected to a vertex of the table cell (step 448). If both ratios are larger than the threshold r, the oblique line is recognized as a table cell content element, and is removed from the cell-oblique line candidate list (step 450).

If one of the ratios is smaller than the threshold r, the corresponding end of the oblique line is adjusted to connect to the vertex (step 452). If the first end of the oblique line is connected to the vertex of the table cell, but the second end of the oblique line is not, the second end is adjusted so that it connects to the nearest standard point of the table cell border (step 456).

Figure 18:
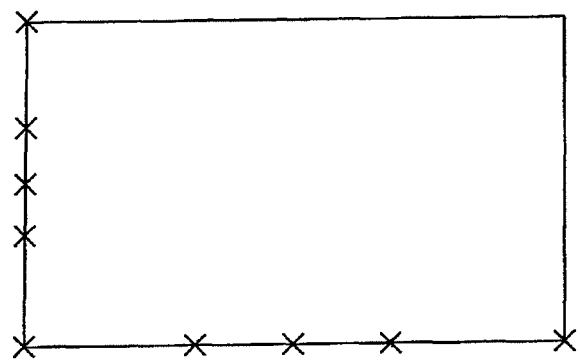
FIG. 18 shows a table object cell and oblique line connection points.
Figure 19A:
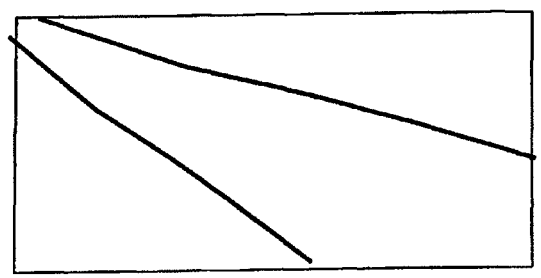
FIGS. 19a and 19b show a table object cell with hand-drawn and recognized oblique line partitions.
Figure 19B:
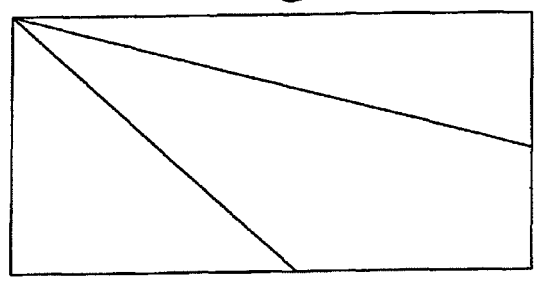

The standard points are a set of connection points predefined on each table cell border. For each table cell border, these connection points include the two ends of the oblique line, the middle point, the points whose distances to the nearest line end are ⅓ of the length of the table cell border, as well as other preferred points. An example of standard points associated with a table cell is shown in FIG. 18, where the connection points are marked as "X". FIGS. 19a and 19b show a table cell before oblique-line recognition and after oblique-line recognition.

Figure 20:
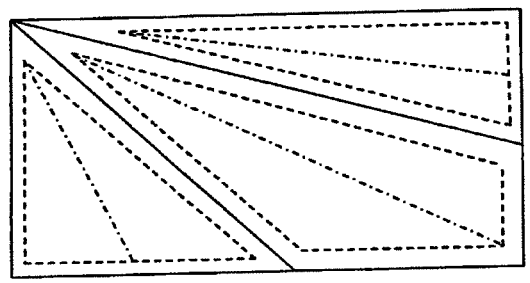
FIG. 20 shows a table object cell partitioned into sub-cells and table object content regions of the sub-cells.
Figure 21A:
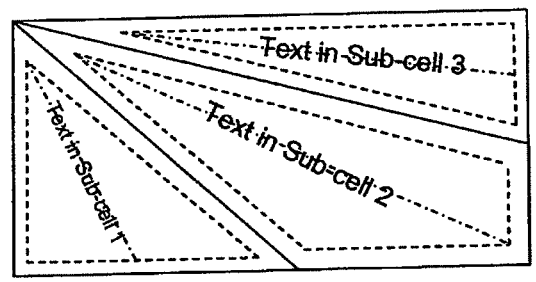
FIGS. 21a and 21b show the table object cell of FIG. 20 populated with table object cell content.
Figure 21B:
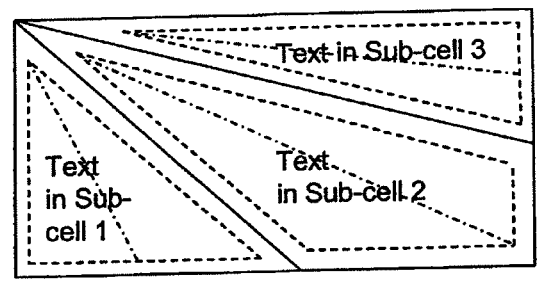

After all oblique lines in a table cell have been processed, the table cell is partitioned into sub-cells by the oblique lines. The position of the table cell content in the table cell is then adjusted so that the table cell content fits into the corresponding sub-cells (step 458). In this step, the content area for each sub-cell is defined as the area in each sub-cell with a predefined and user-adjustable margin to the sub-cell border. FIG. 20 shows the content areas (areas with dashed-line borders) in three sub-cells. In each content area, a center line is also defined. The user is provided with two positioning options to arrange table cell content elements in each content area: (1) along the center line within the content area; and (2) along multiple horizontal lines within the content area as shown in FIGS. 21a and 21b. In this embodiment, the first option is used as a default. Each table cell content element is then assigned to a sub-cell according to its center point. That is, if the center point of a table cell content element falls into a sub-cell, the table cell content element is then assigned to that sub-cell and positioned according to the selected positioning option.

In the above embodiment, it is required that the oblique lines in a table cell must merge at an end. However, those of skill in the art will appreciate that this condition may not be necessary and that the ends of an oblique line can be connected to any standard points on the table cell borders.

In yet another embodiment, when a corner table cell is partitioned into two or more sub-cells, the sub-cells are marked as titles. If more than two corner table cells are partitioned into sub-cells, a predefined corner cell (e.g., the upper-left cell) is used for defining the titles.

FIG. 22 shows a schedule table, where the upper-left corner cell is partitioned into two sub-cells. The left sub-cell ("Name") is then defined as the title of the first column, and the cells of the first column ("Peter", "Tom" and "Joey") are defined as the row titles. The right sub-cell ("Day") is defined as the title of the first row, and the cells of the first row ("Monday", "Tuesday", "Wednesday" and "Thursday") are defined as the column titles.

FIG. 23 shows another schedule table, where the upper-left corner cell is partitioned into three sub-cell. The left sub-cell ("Name") is then defined as the title of the first column, and the cells of the first column ("Peter", "Tom" and "Joey") are defined as the row titles. The right sub-cell ("Day") is defined as the title of the first row, and the cells of the first row ("Monday", "Tuesday", "Wednesday" and "Thursday") are defined as the column titles. The sub-cell in the middle ("Task") is defined as the title of all cells except the first row and the first column. With the automatic definition of titles, a table may be used for performing database-like tasks, or for facilitating the connection to databases. It is also useful for printing large tables that extend to multiple pages, where the row/column titles are preferably repeated on each page to facilitate reading. Further, the titles of the columns and rows could automatically be formatted such as for example by making them bold and/or adjusting their font sizes etc.

Although the hand-drawn table recognizing tool 16 has been described with specific reference to its implementation in the SMART Notebook™ application, those of skill in the art will appreciate that the hand-drawn table recognition tool may be used as a stand alone tool or implemented as a feature in other digital ink software environments to facilitate the creation of table objects from hand-drawn freeform lines.

The hand-drawn table recognition tool 16 may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable medium include for example read-only memory, random-access memory, flash memory, CD-ROMs, magnetic tape, optical data storage devices and other storage media. The computer readable program code can also be distributed over a network including coupled computer systems so that the computer readable program code is stored and executed in a distributed fashion or copied over a network for local execution.

Although embodiments have been described with reference to the drawings, those of skill in the art will appreciate that variations and modifications may be made without departing from the spirit and scope thereof as defined by the appended claims.

What is claimed is:

1. A computerized method of recognizing an input hand-drawn table formed by freeform line objects, said method comprising: transforming each freeform line object of said table into one of a vertical line segment and a horizontal line segment; generating a grid system based on the vertical and horizontal line segments; and converting the generated grid system into a table object, wherein said method further comprises, prior to said transforming, examining each freeform line object to determine if the freeform line-object represents table object content, the transforming, generating and converting being performed only on freeform line objects that do not represent table object content, wherein said examining comprises determining if the freeform line object resembles a curve and if so, designating the freeform line object as representing table object content and wherein said transforming further comprises: comparing each created horizontal line segment with a horizontal line segment list to determine if it overlaps with an existing horizontal line segment; if not, adding the created horizontal line segment to the list and, if so, performing the merging; comparing each created vertical line segment with a vertical line segment list to determine if it overlaps with an existing vertical line segment; and if not, adding the created vertical line segment to the list and, if so, performing the merging and prior to said comparing to determine overlap: examining each horizontal line segment to determine if it is within a threshold vertical distance of an existing horizontal line segment in the horizontal line segment list; if so, performing said comparing to determine overlap and, if not, bypassing the overlap comparing and adding the horizontal line segment to the list; and examining each vertical line segment to determine if it is within a threshold horizontal distance of an existing vertical line segment in the vertical line segment list; and if so, performing said comparing to determine overlap and, if not, bypassing the overlap comparing and adding the vertical line segment to the list.

2. The method of claim 1 wherein said transforming comprises for each freeform line object: examining the orientation of the freeform line object; and creating one of the horizontal and vertical line segment representing the freeform line object based on the orientation thereof.

3. The method of claim 2 wherein said transforming further comprises for each freeform line object: determining the start point and end point of the freeform line object; generating a temporary line segment extending between the determined start point and end point; determining the orientation of said temporary line segment; and based on the determined orientation, creating one of said horizontal line segment and vertical line segment.

4. The method of claim 3 wherein said transforming further comprises: for each created horizontal line segment, determining whether it overlaps with an existing horizontal line segment and, if so, merging the created and existing horizontal line segments; and for each created vertical line segment, determining whether it overlaps with an existing vertical line segment and, if so, merging the created and existing vertical line segments.

5. The method of claim 1 wherein said grid system is generated based on deemed intersections of the horizontal and vertical line segments.

6. The method of claim 5 wherein said grid system generating comprises: selecting pairs of adjacent vertical and adjacent horizontal line segments; and for each pair of adjacent vertical line segments and each pair of adjacent horizontal line segments, determining the intersection points therebetween thereby to yield four corner coordinates of each grid in the grid system.

7. The method of claim 6 wherein said grid system generating comprises: for each pair of adjacent vertical line segments and each pair of adjacent horizontal line segments, arranging the vertical and horizontal line segments into different combinations, each combination comprising one vertical line segment and one horizontal line segment; and for each combination, calculating the intersection point between the vertical and horizontal line segments thereby to calculate said corner coordinates.

8. The method of claim 7 further comprising calculating an effective intersection point for each combination of non-intersecting vertical and horizontal line segments that are within a threshold separation distance.

9. The method of claim 6 wherein said converting comprises using the four corner coordinates of each grid to define corners of a corresponding cell of said table object.

10. The method of claim 9 wherein said grid system generating comprises: for each pair of adjacent vertical line segments and each pair of adjacent horizontal line segments, arranging the vertical and horizontal line segments into different combinations, each combination comprising one vertical line segment and one horizontal line segment; and for each combination, calculating the intersection point between the vertical and horizontal line segments thereby to calculate said corner coordinates.

11. The method of claim 9 wherein said transforming comprises for each freeform line object: examining the orientation of the freeform line object; and creating one of the horizontal and vertical line segment representing the freeform line object based on the orientation thereof.

12. The method of claim 11 wherein said transforming further comprises for each freeform line object: determining the start point and end point of the freeform line object;

generating a temporary line segment extending between the determined start point and end point; determining the orientation of said temporary line segment; and based on the determined orientation, creating one of said horizontal line segment and vertical line segment.

13. The method of claim 12 wherein said transforming further comprises: for each created horizontal line segment, determining whether it overlaps with an existing horizontal line segment and, if so, merging the created and existing horizontal line segments; and for each created vertical line segment, determining whether it overlaps with an existing vertical line segment and, if so, merging the created and existing vertical line segments.

14. The method of claim 1 further comprising: detecting input non-freeform line objects that are within the table object; and inserting the detected non-freeform line objects as table object content.

15. The method of claim 14 wherein during said inserting, each detected non-freeform table line object is placed into a corresponding cell of said table object as table cell content.

16. The method of claim 15 wherein said detecting comprises determining non-freeform line objects having designated locations positioned within a cell of the table object.

17. The method of claim 15 wherein said transforming comprises for each freeform line object: examining the orientation of the freeform line object; and creating one of the horizontal and vertical line segment representing the freeform line object based on the orientation thereof.

18. The method of claim 17 wherein said transforming further comprises for each freeform line object: determining the start point and end point of the freeform line object; generating a temporary line segment extending between the determined start point and end point; determining the orientation of said temporary line segment; and based on the determined orientation, creating one of said horizontal line segment and vertical line segment.

19. The method of claim 18 wherein said transforming further comprises: for each created horizontal line segment, determining whether it overlaps with an existing horizontal line segment and, if so, merging the created and existing horizontal line segments; and for each created vertical line segment, determining whether it overlaps with an existing vertical line segment and, if so, merging the created and existing vertical line segments.

20. The method of claim 19 wherein said grid system is generated based on deemed intersections of the horizontal and vertical line segments.

21. The method of claim 20 wherein said grid system generating comprises: selecting pairs of adjacent vertical and adjacent horizontal line segments; and for each pair of adjacent vertical line segments and each pair of adjacent horizontal line segments, determining the intersection points therebetween thereby to yield four corner coordinates of each grid in the grid system.

22. The method of claim 21 wherein said grid system generating comprises: for each pair of adjacent vertical line segments and each pair of adjacent horizontal line segments, arranging the vertical and horizontal line segments into different combinations, each combination comprising one vertical line segment and one horizontal line segment; and for each combination, calculating the intersection point between the vertical and horizontal line segments thereby to calculate said corner coordinates.

23. The method of claim 15 further comprising processing the table object based on the table cell content placed in the table object.

24. The method of claim 1 wherein said examining further comprises, if the freeform line object does not resemble a curve, determining if the freeform line object resembles a letter, if so determining if the letter is a letter that resembles the shape of a table outline and if not, designating the freeform line object as representing table object content.

25. The method of claim 24, wherein if the letter resembles the shape of a table outline, examining the slopes of line segments making up the freeform line object to determine if each line segment resembles either a vertical line or a horizontal line, and if not, designating the freeform line object as representing table object content.

26. The method of claim 25 wherein if the freeform line object does not resemble a letter, determining if the freeform line object represents an oblique line and if so, designating the freeform line object as representing table object content.

27. The method of claim 26 further comprising identifying each transformed freeform line object not used to generate said grid system and processing the freeform line object to determine if the freeform line object represents one of a table outline element, table object content and object content external to said table object.

28. The method of claim 25 further comprising identifying each transformed freeform line object not used to generate said grid system and processing the freeform line object to determine if the freeform line object represents one of a table outline element, table object content and object content external to said table object.

29. The method of claim 25 wherein if the freeform line object does not resemble a letter, determining if the freeform line object represents an oblique line and if so, identifying the freeform line object as a table cell partition candidate.

30. The method of claim 29 further comprising after said converting processing each table cell partition candidate to verify the same and sub-dividing cells of said table object using verified table cell partitions.

31. A non-transitory computer readable medium embodying computer program code for recognizing an input hand-drawn table formed by freeform line objects, said computer program code comprising: program code for transforming each freeform line object of said table into one of a vertical line segment and a horizontal line segment; program code for generating a grid system based on the vertical and horizontal line segments; program code for converting the generated grid system into a table object; and program code for, prior to said transforming, examining each freeform line object to determine if the freeform line-object represents table object content, the transforming, generating and converting being performed only on freeform line objects that do not represent table object content, wherein said examining comprises determining if the freeform line object resembles a curve and if so, designating the freeform line object as representing table object content and wherein said transforming further comprises: comparing each created horizontal line segment with a horizontal line segment list to determine if it overlaps with an existing horizontal line segment; if not, adding the created horizontal line segment to the list and, if so, performing the merging; comparing each created vertical line segment with a vertical line segment list to determine if it overlaps with an existing vertical line segment; and if not, adding the created vertical line segment to the list and, if so, performing the merging and prior to said comparing to determine overlap: examining each horizontal line segment to determine if it is within a threshold vertical distance of an existing horizontal line segment in the horizontal line segment list; if so, performing said comparing to determine overlap and, if not, bypassing the overlap comparing and adding the horizontal line segment to the list; and examining each vertical line segment to determine if it is within a threshold horizontal distance of an existing vertical line segment in the vertical line segment list; and if so, performing said comparing to determine overlap and, if not, bypassing the overlap comparing and adding the vertical line segment to the list.

32. An interactive input system comprising: a coordinate input device having a display surface on which an image is presented, said coordinate input device being responsive to user input; and processing structure communicating with said coordinate input device and updating the image presented on said display surface to reflect user input, said processing structure executing a table recognition procedure when invoked in response to user input to recognize a hand-drawn table formed by freeform line objects entered on said coordinate input device and convert the recognized hand-drawn table into a table object, wherein said table recognition procedure comprises computer program code comprising: program code for transforming each freeform line object of said table into one of a vertical line segment and a horizontal line segment; program code for generating a grid system based on the vertical and horizontal line segments; program code for converting the generated grid system into a table object; and program code for, prior to said transforming, examining each freeform line object to determine if the freeform line-object represents table object content, the transforming, generating and converting being performed only on freeform line objects that do not represent table object content, wherein during execution of said table recognition procedure, said processing structure detects other displayed objects that overlap with said hand-drawn table and places the detected other objects as table cell content in cells of said table object and wherein said transforming further comprises: comparing each created horizontal line segment with a horizontal line segment list to determine if it overlaps with an existing horizontal line segment; if not, adding the created horizontal line segment to the list and, if so, performing the merging; comparing each created vertical line segment with a vertical line segment list to determine if it overlaps with an existing vertical line segment; and if not, adding the created vertical line segment to the list and, if so, performing the merging and prior to said comparing to determine overlap: examining each horizontal line segment to determine if it is within a threshold vertical distance of an existing horizontal line segment in the horizontal line segment list; if so, performing said comparing to determine overlap and, if not, bypassing the overlap comparing and adding the horizontal line segment to the list; and examining each vertical line segment to determine if it is within a threshold horizontal distance of an existing vertical line segment in the vertical line segment list; and if so, performing said comparing to determine overlap and, if not, bypassing the overlap comparing and adding the vertical line segment to the list.

33. An interactive input system comprising: a coordinate input device having a display surface on which an image is presented, said coordinate input device being responsive to user input; and processing structure communicating with said coordinate input device and updating the image presented on said display surface to reflect user input, said processing structure executing a table recognition procedure when invoked in response to user input to recognize a hand-drawn table formed by freeform line objects entered on said coordinate input device and convert the recognized hand-drawn table into a table object, wherein said table recognition procedure comprises computer program code comprising: program code for transforming each freeform line object of said table into one of a vertical line segment and a horizontal line segment; program code for generating a grid system based on the vertical and horizontal line segments; program code for converting the generated grid system into a table object; and program code for, prior to said transforming, examining each freeform line object to determine if the freeform line-object represents table object content, the transforming, generating and converting being performed only on freeform line objects that do not represent table object content, wherein during said hand-drawn table recognition, said processing structure transforms each freeform line object forming said hand-drawn table into one of a vertical line segment and a horizontal line segment, generates a grid system based on the vertical and horizontal line segments and converts the generated grid system into said table object and wherein said transforming further comprises: comparing each created horizontal line segment with a horizontal line segment list to determine if it overlaps with an existing horizontal line segment; if not, adding the created horizontal line segment to the list and, if so, performing the merging; comparing each created vertical line segment with a vertical line segment list to determine if it overlaps with an existing vertical line segment; and if not, adding the created vertical line segment to the list and, if so, performing the merging and prior to said comparing to determine overlap: examining each horizontal line segment to determine if it is within a threshold vertical distance of an existing horizontal line segment in the horizontal line segment list; if so, performing said comparing to determine overlap and, if not, bypassing the overlap comparing and adding the horizontal line segment to the list; and examining each vertical line segment to determine if it is within a threshold horizontal distance of an existing vertical line segment in the vertical line segment list; and if so, performing said comparing to determine overlap and, if not, bypassing the overlap comparing and adding the vertical line segment to the list.

34. A computerized method of recognizing an input hand-drawn table formed by freeform line objects, said method comprising: transforming each freeform line object of said table into one of a vertical line segment and a horizontal line segment; generating a grid system based on the vertical and horizontal line segments; converting the generated grid system into a table object, wherein said method further comprises, prior to said transforming, examining each freeform line object to determine if the freeform line-object represents table object content, the transforming, generating and converting being performed only on freeform line objects that do not represent table object content; detecting input non-freeform line objects that are within the table object; and inserting the detected non-freeform line objects as table object content and wherein said transforming further comprises: comparing each created horizontal line segment with a horizontal line segment list to determine if it overlaps with an existing horizontal line segment; if not, adding the created horizontal line segment to the list and, if so, performing the merging; comparing each created vertical line segment with a vertical line segment list to determine if it overlaps with an existing vertical line segment; and if not, adding the created vertical line segment to the list and, if so, performing the merging and prior to said comparing to determine overlap: examining each horizontal line segment to determine if it is within a threshold vertical distance of an existing horizontal line segment in the horizontal line segment list; if so, performing said comparing to determine overlap and, if not, bypassing the overlap comparing and adding the horizontal line segment to the list; and examining each vertical line segment to determine if it is within a threshold horizontal distance of an existing vertical line segment in the vertical line segment list; and if so, performing said comparing to determine overlap and, if not, bypassing the overlap comparing and adding the vertical line segment to the list.

35. The method of claim 34 wherein during said inserting, each detected non-freeform line object is placed into a corresponding cell of said table object as table cell content.

36. The method of claim 35 wherein said detecting comprises determining non-freeform line objects having designated locations positioned within a cell of the table object.

37. The method of claim 35 wherein said transforming comprises for each freeform line object: examining the orientation of the freeform line object; and creating one of the horizontal and vertical line segment representing the freeform line object based on the orientation thereof.

38. The method of claim 37 wherein said transforming further comprises for each freeform line object: determining the start point and end point of the freeform line object; generating a temporary line segment extending between the determined start point and end point; determining the orientation of said temporary line segment; and based on the determined orientation, creating one of said horizontal line segment and vertical line segment.

39. The method of claim 38 wherein said transforming further comprises: for each created horizontal line segment, determining whether it overlaps with an existing horizontal line segment and, if so, merging the created and existing horizontal line segments; and for each created vertical line segment, determining whether it overlaps with an existing vertical line segment and, if so, merging the created and existing vertical line segments.

40. The method of claim 39 wherein said grid system is generated based on deemed intersections of the horizontal and vertical line segments.

41. The method of claim 40 wherein said grid system generating comprises: selecting pairs of adjacent vertical and adjacent horizontal line segments; and for each pair of adjacent vertical line segments and each pair of adjacent horizontal line segments, determining the intersection points therebetween thereby to yield four corner coordinates of each grid in the grid system.

42. The method of claim 41 wherein said grid system generating comprises: for each pair of adjacent vertical line segments and each pair of adjacent horizontal line segments, arranging the vertical and horizontal line segments into different combinations, each combination comprising one vertical line segment and one horizontal line segment; and for each combination, calculating the intersection point between the vertical and horizontal line segments thereby to calculate said corner coordinates.

43. The method of claim 35 further comprising processing the table object based on the table cell content placed in the table object.

44. The method of claim 43 wherein processing the table object comprises: recognizing the content in a first table cell as a predetermined processing indicator; processing the content in one or more table cells differing from said first table cell according to the recognized processing indicator; and replacing the content in said first table cell with the result of the processing.

45. The method of claim 44 wherein the content in the first table cell is a hand-drawn object.

46. The method of claim 45 wherein said processing indicator is a mathematical plus sign and wherein the result of the processing is a summation.

47. A computerized method of recognizing an input hand-drawn table formed by freeform line objects, said method comprising: transforming each freeform line object of said table into one of a vertical line segment and a horizontal line segment; generating a grid system based on the vertical and horizontal line segments; and converting the generated grid system into a table object, wherein said method further comprises, prior to said transforming, examining each freeform line object to determine if the freeform line-object represents table object content, the transforming, generating and converting being performed only on freeform line objects that do not represent table object content, wherein said grid system is generated based on deemed intersections of the horizontal and vertical line segments and wherein said grid system generating comprises: selecting pairs of adjacent vertical and adjacent horizontal line segments; for each pair of adjacent vertical line segments and each pair of adjacent horizontal line segments, arranging the vertical and horizontal line segments into different combinations, each combination comprising one vertical line segment and one horizontal line segment; for each combination, calculating the intersection point between the vertical and horizontal line segments thereby to calculate corner coordinates of each grid in the grid system; and calculating an effective intersection point for each combination of non-intersecting vertical and horizontal line segments that are within a threshold separation distance.

48. A computerized method of recognizing an input hand-drawn table formed by freeform line objects, said method comprising: transforming each freeform line object of said table into one of a vertical line segment and a horizontal line segment; generating a grid system based on the vertical and horizontal line segments; and converting the generated grid system into a table object, wherein said method further comprises, prior to said transforming, examining each freeform line object to determine if the freeform line-object represents table object content, the transforming, generating and converting being performed only on freeform line objects that do not represent table object content, wherein said transforming comprises for each freeform line object: determining the start point and end point of the freeform line object; generating a temporary line segment extending between the determined start point and end point; determining the orientation of said temporary line segment; and transforming further comprises: comparing each created horizontal line segment with a horizontal line segment list to determine if it overlaps with an existing horizontal line segment; if not, adding the created horizontal line segment to the list and, if so, performing the merging; comparing each created vertical line segment with a vertical line segment list to determine if it overlaps with an existing vertical line segment; and if not, adding the created vertical line segment to the list and, if so, performing the merging, and based on the determined orientation, creating one of said horizontal line segment and vertical line segment; for each created horizontal line segment, determining whether it overlaps with an existing horizontal line segment and, if so, merging the created and existing horizontal line segments; and for each created vertical line segment, determining whether it overlaps with an existing vertical line segment and, if so, merging the created and existing vertical line segments.

49. The method of claim 48 wherein said transforming further comprises, prior to said comparing to determine overlap: examining each horizontal line segment to determine if it is within a threshold vertical distance of an existing horizontal line segment in the horizontal line segment list; if so, performing said comparing to determine overlap and, if not, bypassing the overlap comparing and adding the horizontal line segment to the list; and examining each vertical line segment to determine if it is within a threshold horizontal distance of an existing vertical line segment in the vertical line segment list; and if so, performing said comparing to determine overlap and, if not, bypassing the overlap comparing and adding the vertical line segment to the list.

* * * * *